(12) United States Patent
Kim et al.

(10) Patent No.: US 11,313,528 B2
(45) Date of Patent: Apr. 26, 2022

(54) OPTICAL SYSTEM FOR VEHICLE AND VEHICLE LAMP USING THE SAME

(71) Applicant: SL Corporation, Daegu (KR)

(72) Inventors: Jong Woon Kim, Gyeongsangbuk-do (KR); Hyeong Do Kim, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 569 days.

(21) Appl. No.: 16/190,727

(22) Filed: Nov. 14, 2018

(65) Prior Publication Data

US 2019/0203897 A1    Jul. 4, 2019

(30) Foreign Application Priority Data

Dec. 29, 2017   (KR) .......................... 10-2017-0184323
Dec. 29, 2017   (KR) .......................... 10-2017-0184324

(51) Int. Cl.
| | |
|---|---|
| *F21S 41/25* | (2018.01) |
| *G02B 27/00* | (2006.01) |
| *G02B 27/09* | (2006.01) |
| *G02B 13/02* | (2006.01) |
| *F21S 41/143* | (2018.01) |
| *F21S 41/265* | (2018.01) |
| *F21S 41/255* | (2018.01) |
| *F21S 41/20* | (2018.01) |

(52) U.S. Cl.
CPC .............. *F21S 41/25* (2018.01); *F21S 41/143* (2018.01); *F21S 41/255* (2018.01); *F21S 41/265* (2018.01); *F21S 41/285* (2018.01); *G02B 13/02* (2013.01); *G02B 27/0025* (2013.01); *G02B 27/0955* (2013.01)

(58) Field of Classification Search
CPC ........ F21S 41/25; F21S 41/265; F21S 41/143; F21S 41/255; F21S 41/285; G02B 13/02; G02B 13/0025; G02B 13/0955
USPC .......................................................... 359/745
See application file for complete search history.

(56) References Cited

U.S. PATENT DOCUMENTS

| | | | | |
|---|---|---|---|---|
| 5,905,597 A | * | 5/1999 | Mizouchi | ............... G02B 13/08 359/671 |
| 2002/0171809 A1 | * | 11/2002 | Kurtz | ................... H04N 9/3105 353/20 |

* cited by examiner

*Primary Examiner* — Marin Pichler
*Assistant Examiner* — Mitchell T Oestreich
(74) *Attorney, Agent, or Firm* — United One Law Group LLC; Kongsik Kim; Jhongwoo Peck

(57) ABSTRACT

An optical system including a plurality of lenses is provided. In particular, a horizontal field of view and a vertical field of view of the optical system are different from each other, and a horizontal effective focal length (EFL) and a vertical EFL of the optical system are different from each other. In addition, a retro-focus type optical system is formed in one of a horizontal direction or a vertical direction, and a telephoto type optical system is formed in the other of the horizontal direction or the vertical direction such that a beam pattern from a square-shaped light source is extended laterally.

21 Claims, 32 Drawing Sheets

Y-AXIS

X-AXIS

Y-AXIS

X-AXIS

Y-AXIS

X-AXIS

Y-AXIS

X-AXIS

Y-AXIS

X-AXIS

Y-AXIS

X-AXIS

—— Actual FOV
---- Paraxial FOV

Y-AXIS

X-AXIS

—— Actual FOV
---- Paraxial FOV

Y-AXIS

X-AXIS

— Actual FOV
---- Paraxial FOV

OPTICAL SYSTEM FOR VEHICLE AND VEHICLE LAMP USING THE SAME

CROSS-REFERENCE TO RELATED APPLICATIONS

This application claims priority from Korean Patent Application KR 10-2017-0184323 filed on Dec. 29, 2017 and KR 10-2017-0184324 filed on Dec. 29, 2017, the disclosures of which are incorporated herein by reference in their entirety.

BACKGROUND

1. Field of the Disclosure

The present disclosure relates to an optical system for a vehicle, and more particularly, to an optical system for a vehicle in which an optical pattern laterally expands and to a vehicle lamp using the same.

2. Description of the Related Art

Generally, a vehicle includes a variety of lamps which have an illumination function for more easily recognizing an object disposed near the vehicle at low light conditions (e.g., nighttime) or a signaling function for informing other vehicles near the vehicle or road users of a driving state of the vehicle. For example, there are a head lamp and a fog lamp generally used for illumination, a turn signal lamp, a tail lamp, a brake lamp, a side marker, and the like used for signaling. Installation criteria and specifications of these lamps for a vehicle are defined by regulations to satisfy all required functions thereof.

Among lamps for a vehicle, a headlamp, which forms a low beam pattern or a high beam pattern to ensure a front field of vision for a driver while driving a vehicle in a situation in which a prevailing environment is dark, such as during nighttime driving, performs an important function for driving safety. The head lamp generally forms a low beam pattern to prevent a driver of a vehicle in an opposite lane or a driver of a preceding vehicle from being blinded by glare and forms a high beam pattern as necessary when driving at high speed or traveling through a place with dark ambient brightness to promote safe driving. However, high beam pattern is often left on while a vehicle in an opposite lane or a preceding vehicle is not recognized. In this case, a driver of the vehicle in an opposite lane or the preceding vehicle is blinded by glare, and thereby increasing a chance for accidents.

Accordingly, an adaptive head lamp such as an adaptive driving beam (ADB) head lamp is provided, which prevents a driver of a vehicle in an opposite lane or a preceding vehicle from being blinded by automatically adjusting an angle, brightness, a width, a length, and the like of light illumination of the lamp when the vehicle in an opposite lane or the preceding vehicle is recognized while driving with a high beam pattern on. The ADB head lamp forms a dark shadow zone at a space that corresponds to where a vehicle in an opposite lane or a preceding vehicle is disposed by selectively turning on or off a plurality of light sources and includes a plurality of light emitting diodes (LED) for embodying the same.

Beams formed by the plurality of LEDs are formed according to a square shape of each LED, and image pixels on which light is formed also have a square shape. However, it is necessary to modify the shape thereof to be a shape adequate for a vehicle.

SUMMARY

Aspects of the present disclosure provide an optical system for a vehicle in which an optical pattern laterally expands.

It should be noted that objects of the present disclosure are not limited to the above-described objects, and other objects of the present disclosure will be apparent to those skilled in the art from the following descriptions.

According to an aspect of the present disclosure, an optical system may include a plurality of lenses. In particular, a horizontal field of view and a vertical field of view of the optical system may be different from each other, and a horizontal effective focal length (EFL) and a vertical EFL of the optical system may be different from each other. In addition, a retro-focus type optical system may be formed in one of a horizontal direction or a vertical direction, and a telephoto type optical system may be formed in the other of the horizontal direction or the vertical direction. A ratio of the horizontal field of view to the vertical field of view may be greater than 1:1 and less than or equal to 4:1. One or more surfaces of the optical system may include a saddle shape which is vertically convex and horizontally concave or is vertically concave and horizontally convex.

The optical system may satisfy one or more of the following equations:

$$0.41 \leq \frac{F_x}{F_y} \leq 0.57,$$

where Fx is an overall horizontal EFL of the optical system, and Fy is an overall vertical EFL of the optical system;

$$1.63 \leq \frac{f_x}{F_x} \leq 2.49,$$

where $f_x$ is a horizontal EFL of lenses except a lens closest to a light source, and Fx is an overall horizontal EFL of the optical system;

$$1.5 \leq \frac{f_y}{F_y} \leq 2.49,$$

where $F_y$ is a vertical EFL of lenses except for a lens closest to a light source, and Fy is an overall vertical EFL of the optical system; and $$0.83 \leq \frac{f_{fir\_x}}{f_{fir\_y}} \leq 1.2,$$

where $f_{fir\_x}$ is a horizontal EFL of a lens closest to a light source, and $f_{fir\_y}$ is a vertical EFL of the lens closest to the light source.

A numerical aperture (NA) may be greater than or equal to 0.7, and the horizontal field of view and the vertical field of view may be greater than or equal to 4 and less than or equal to 20.

According to another aspect of the present disclosure, a distortion may be generated such that a pixel size of an image formed by light that passes through the lens may gradually increase or decrease from a center toward an edge to be distorted. In the distortion, a horizontal distortion level and a vertical distortion level may be different from each other. In addition, an anamorphic surface of the optical system from which the light is emitted may include a saddle shape which is horizontally concave and vertically convex or horizontally convex and vertically concave.

The pixel size of the image may gradually increase or decrease toward lateral or vertical edges. Further, the distortion may be generated based on the shape of the anamorphic surface of the optical system.

An anamorphic surface (las) of the optical system may satisfy one or more of the following equations:

$$-18.4 \leq \frac{c_{las\_x}}{c_{las\_y}} \leq 6.3,$$

where c is curvature;

$$-5767.4 \leq \frac{z_{las\_x}}{z_{las\_y}} \leq 256.8, \text{ where } z = \frac{1}{2} c \cdot s_{0.1}^2,$$

c is curvature, and 50.1 is a sag value from a lens center to 1/10 of a height of the lens;

$$0.7 \times 10^{-9} \leq \frac{K_{las\_x} c_{las\_x}^3}{D_{las}^4} \leq 1.65 \times 10^{-8},$$

where K is a conic constant, c is curvature, and D is a diameter of the lens;

$$0.7 \times 10^{-10} \leq \frac{8 A_{las\_x}}{D_{las}^4} \leq 1.3 \times 10^{-9},$$

where A is an aspherical fourth-order constant, and D is a diameter of the lens; and $$4.5 \leq \frac{K_{las\_x} c_{las\_x}^3 + 8 A_{las\_x}}{K_{las\_y} c_{las\_y}^3 + 8 A_{las\_y}} \leq 210,$$

where K is a conic constant, c is curvature, and A is an aspherical fourth-order constant.

A first lens of the optical system on which the light is incident may satisfy an equation, $$0.75 \leq \frac{d_{first}}{D_{first}} \leq 1.45,$$

where d is a thickness of the lens, and D is a diameter of the lens.

Furthermore, a first lens of the optical system on which the light is incident may have an Abbe number that is greater than or equal to 45. A mean refractive index of all lenses included in the optical system may be between 1.6 and 1.8, inclusive.

According to another aspect of the present disclosure, a vehicle lamp may include a light source and optical lenses having a plurality of lenses and transmitting light emitted by the light source. In the optical lenses, a horizontal field of view and a vertical field of view may be different from each other, and a horizontal EFL and a vertical EFL may be different from each other. In addition, a retro-focus type optical system may be formed in one of a horizontal direction or a vertical direction, and a telephoto type optical system is formed in the other of the horizontal direction or the vertical direction.

A distortion may be generated such that a pixel size of an image, on which light that passes through the optical lens and is emitted is formed, may gradually increase or decrease from a center toward an edge to be distorted. In the distortion, a horizontal distortion level and a vertical distortion level may be different from each other. Further, an anamorphic surface of the optical lens from which the light is emitted may include a saddle shape which is horizontally concave and vertically convex or horizontally convex and vertically concave.

Details of other examples are included in a detailed description and drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
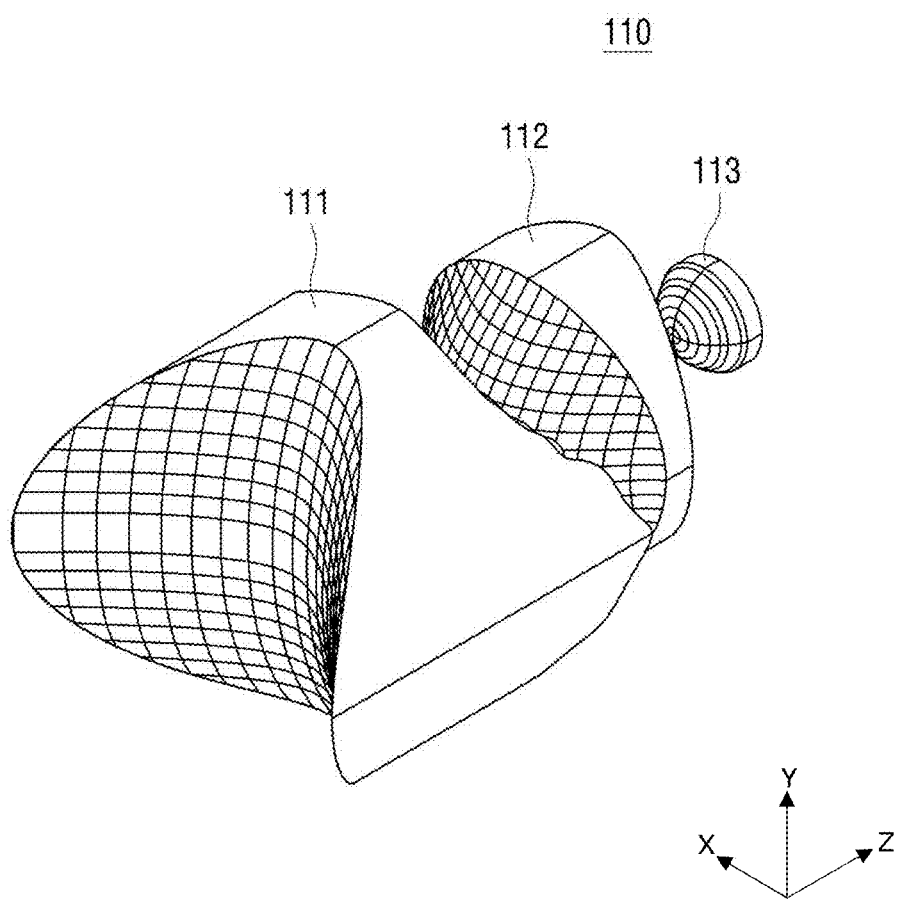
FIG. 1 illustrates an optical system according to some exemplary embodiments of the present disclosure.

Advantages and features of the present disclosure and a method of achieving the same will become apparent with reference to the attached drawings and exemplary embodiments described below in detail. However, the present disclosure is not limited to the exemplary embodiments described below and may be embodied with a variety of different modifications. The exemplary embodiments are merely provided to allow one of ordinary skill in the art to completely understand the scope of the present disclosure and are defined by the scope of the claims. Throughout the specification, like reference numerals refer to like elements.

Unless defined otherwise, all the terms (including technical and scientific terms) used herein have the same meaning as commonly understood by one of ordinary skill in the art to which this invention belongs. Also, terms such as those defined in commonly used dictionaries should not be interpreted in an idealized or excessively formal sense unless defined otherwise.

The terms used herein are for explaining embodiments but are not intended to limit the present disclosure. Throughout the specification, unless particularly defined otherwise, singular forms include plural forms. The terms "comprises" and/or "comprising" are used herein as meanings which do not exclude presence or addition of one or more other components in addition to stated components.

When an optical system is used as a vehicle head lamp, for the optical system to illuminate a front of a vehicle more widely, it may be necessary to increase a field of view. However, in this case, since unnecessary light may be projected in vertical directions, efficiency may be decreased. Accordingly, it may be necessary to form a beam pattern of the vehicle, which has a lateral length that is greater than a vertical length, to increase both a field of view and the efficiency. Generally, a plurality of light sources are used while overlapping one another to form a beam pattern having a rectangular shape in which a lateral length is longer than a vertical length. It may be inefficient and expensive to use a plurality of light sources to form one rectangular unit pattern. Conversely, when a laterally-extended rectangular beam pattern in which a lateral length is longer than a vertical length is formed using one light source without overlapping a plurality of light sources, a light source may be efficiently used and a necessary beam pattern may be formed at a decreased cost. Moreover, light intensity at or around a center of a beam pattern of a vehicle, and more particularly, of a high beam, is significant. An optical system having a high refractive power may be required to maintain light intensity above a certain level at the center.

To form a beam pattern having a laterally-extended shape adequate for a vehicle, an optical system according to some exemplary embodiments of the present disclosure may include a plurality of lenses such that a field of view in a horizontal direction (X-axis direction) and a field of view in a vertical direction (Y-axis direction) may be different from each other. As shown in FIG. 1, in an optical system 110, when a light source is disposed at a position on a rear side of a lens 113 closest to the light source and light is emitted by the light source, the emitted light from the light source may sequentially pass through a plurality of lenses 113, 112, and 111 and be emitted. An optical system may be configured to extend a beam pattern formed by emitted light laterally.

Figure 2A:
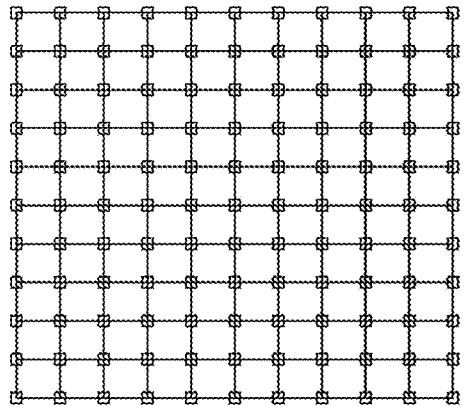
FIGS. 2A and 2B illustrate a beam pattern which laterally expands due to the optical system according to some exemplary embodiments of the present disclosure.
Figure 2B:
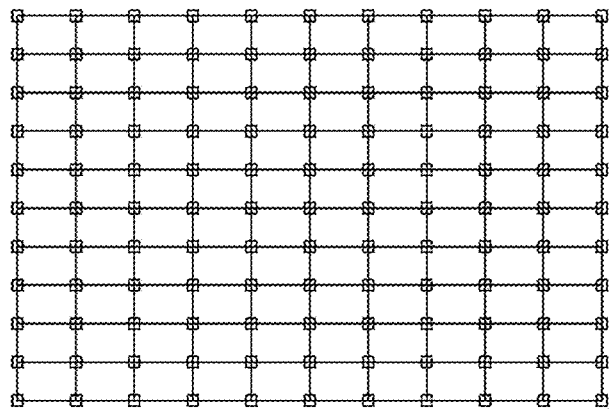

A beam pattern formed passing through a square-shaped optical system is shown in FIG. 2A, and a beam pattern passing through the optical system, which extends laterally, may be formed as shown in FIG. 2B. In other words, a beam pattern in which a lateral length is longer than a vertical length may be formed, which may be necessary for a vehicular optical system.

To implement an anamorphic optical system in which a horizontal field of view and a vertical field of view are different, a retro-focus type optical system may be formed in one of a horizontal direction or a vertical direction and a telephoto type optical system may be formed in the other of the horizontal direction or the vertical direction. To implement a laterally extended type optical system, the retro-focus type optical system may be formed in a horizontal direction and the telephoto type optical system may be formed in a vertical direction. The retro-focus type optical system may refer to an optical system in which an effective focal length (EFL) is shorter than a back focal length (BFL). The telephoto type optical system may refer to an optical system in which an EFL is longer than a BFL. The retro-focus type optical system may be formed in the horizontal direction and the telephoto type optical system may be formed in the vertical direction for lateral extension to allow the optical system to be laterally extended. Lenses disposed on a light source side other than the lens 113 that is closest to the light source may be referred to as a first group of lenses. The EFL may be formed to be shorter than the BFL in a horizontal direction of the first group of lenses, and the EFL may be formed to be longer than the BFL in a vertical direction of the first group of lenses.

To implement an anamorphic optical system, one or more surfaces of the optical system may be formed as a saddle shape which is vertically convex and horizontally concave or vertically concave and horizontally convex. To decrease a vertical field of view and increase a horizontal field of view, a surface, which is a right surface of the lens 111 farthest from the light source of FIG. 1 and is farthest from the light source, may be configured as a convex surface toward a light exit surface in a vertical direction to have a positive focal length and may be configured as a concave surface toward a light exit surface in a horizontal direction to have a negative focal length. Accordingly, a saddle surface shape which is convex in the vertical direction and concave in the horizontal direction may be formed.

Other surfaces of the optical system except the surface farthest from the light source may be formed to be convex, concave, or a saddle shape. In implementations having three lenses, a first surface may have a saddle shape, a third surface may have a convex shape, a fifth surface may have a convex shape, and a sixth surface may have a plane shape. The sixth surface may be formed in a substantially plane shape although it may be slightly convex or concave. The second surface and the fourth surface may be formed to be convex or concave.

In the laterally extended optical system, a ratio of the horizontal field of view to the vertical field of view may be configured to be more than 1:1 and less than or equal to 4:1. To form a laterally-extended beam pattern at a ratio adequate for a vehicle, a field of view ratio may be set to be 1:1 to 4:1. Depending on specifications or functions required for a vehicle, the field of view ratio may exceed the range. When only a high beam pattern is embodied, the field of view ratio may be 2:1. When ADB is embodied at the same time, the field of view ratio may be 4:1 or more.

In particular, each of the horizontal field of view and the vertical field of view may be 4 degrees or more and 20 degrees or less. For an optical system applied to a vehicle lamp, a horizontal field of view and a vertical field of view may be set to be 4 degrees or more and 20 degrees or less in accordance with the regulations. The field of views may be determined according to standards of the regulations.

To form a horizontal field of view and a vertical field of view which are different from each other, a horizontal EFL and a vertical EFL may be made to be different from each other. Some lenses of an optical system may have a horizontal curvature and a vertical curvature which are different from each other to have different focal lengths to form a horizontal field of view and a vertical field of view to be different from each other. Accordingly, the optical system may be formed to satisfy the following equation (Equation 1).

$$0.41 \leq \frac{F_x}{F_y} \leq 0.57 \qquad \text{Equation 1}$$

where Fx is an overall horizontal EFL of the optical system, and Fy is an overall vertical EFL of the optical system.

In addition, to form a retro-focus type optical system by forming horizontal EFLs of a first group of lenses, except a lens closest to a light source, to be shorter than BFLs thereof and to form a particular ratio of the horizontal EFLs of the first group of lenses to the overall horizontal EFL of the optical system simultaneously, the optical system may be formed to satisfy the following equation (Equation 2).

$$1.5 \leq \frac{f_y}{F_y} \leq 2.49 \qquad \text{Equation 3}$$

where $F_x$ is a horizontal EFL of lenses except a lens closest to a light source.

Corresponding to the horizontal direction, to form a telephoto type optical system by forming vertical EFLs of a first group of lenses, except the lens closest to a light source, to be longer than BFLs thereof and to form a particular ratio of the vertical EFLs of the first group of lenses to the overall vertical EFL of the optical system simultaneously, the optical system may be formed to satisfy the following equation (Equation 3).

$$1.5 \leq \frac{f_y}{F_y} \leq 2.49 \qquad \text{Equation 3}$$

where $f_y$ is a vertical EFL of lenses except for a lens closest to a light source.

In conventional implementations, a field of view of a light source extends laterally such that light intensity is reduced. To form a laterally extended beam pattern and to maintain light intensity at the same time, a numerical aperture (NA) may be formed to be greater than or equal to 0.7. The NA is a value which refers to brightness. To implement an NA of an optical system having high light efficiency of 0.7 or greater, the lens 113 disposed near the light source and closest to the light source may be a lens that includes a positive focal length, and a curvature diameter of a front surface of the corresponding lens may be smaller than a curvature diameter of a rear surface thereof. The lens closest to the light source may increase efficiency of the optical system by reducing a diffusion angle of light diffused in the light source (e.g., a light emitting diode (LED)). To increase efficiency of the LED as the light source, an optical system may be made to have a large NA. In the case of the NA of the optical system, a lens having a high refractive power may be used as the lens 113 closest to the light source and closest to a top surface to increase the NA. To allow a general lens to have a high refractive power, a value of curvature may be increased. As the curvature increases, a thickness of the lens may increase.

Since the lens 113 closest to the light source collects (e.g., collimates) light to allow the optical system to have higher brightness, the lens 113 may include a higher refractive power than other lenses of the optical system. Further, instead of an anamorphic shape, an optical system having a general rotationally symmetrical (e.g., axisymmetric) shape may be formed. Since a high refractive power refers to a short focal length, a lens closest to a light source may be formed to satisfy the following equation (Equation 4).

$$0.83 \leq \frac{f_{fir\_x}}{f_{fir\_y}} \leq 1.2 \qquad \text{Equation 4}$$

where $f_{fir\_x}$ refers to a horizontal EFL of a lens closest to a light source, and $f_{fir\_y}$ refers to a vertical EFL of the lens closest to the light source.

Figure 5:
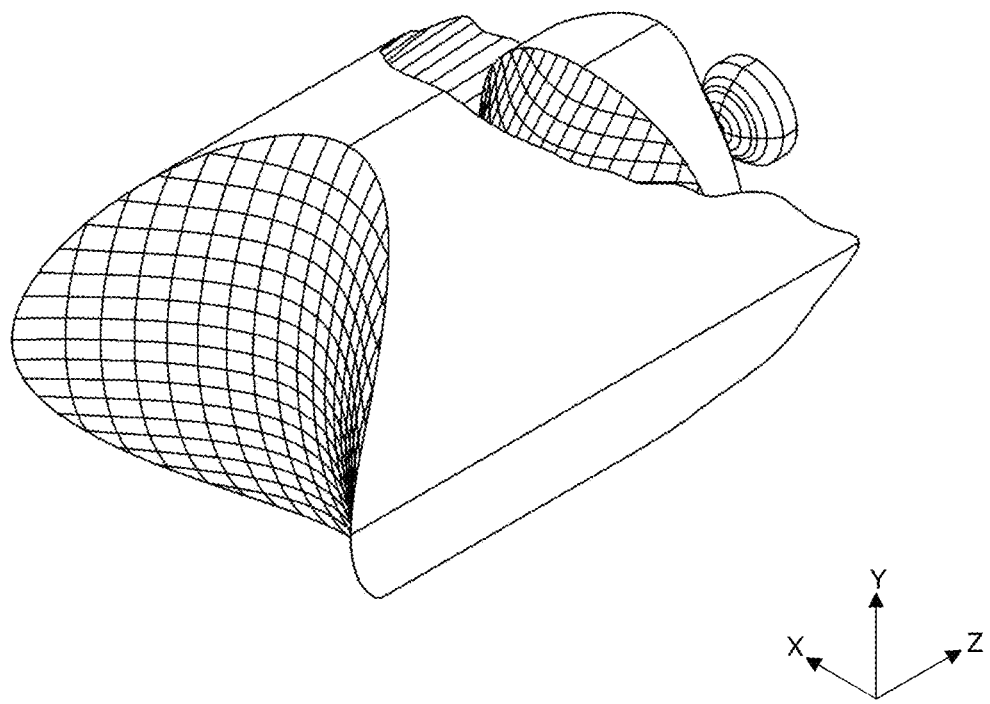
FIGS. 5, 8, 11, and 14 illustrate an optical system according to other exemplary embodiments of the present disclosure.
Figure 8:
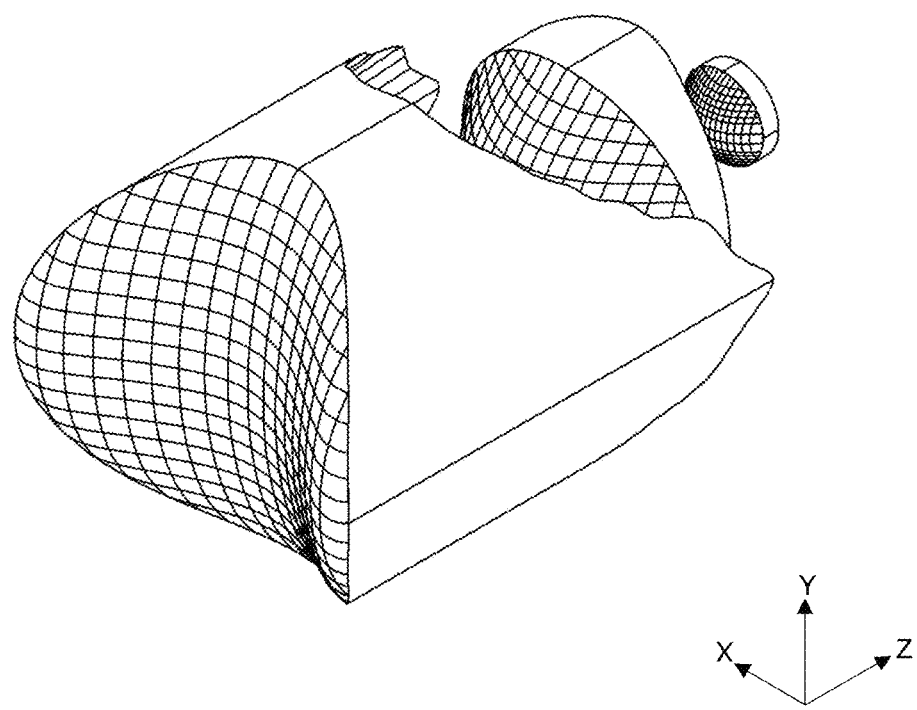
Figure 11:
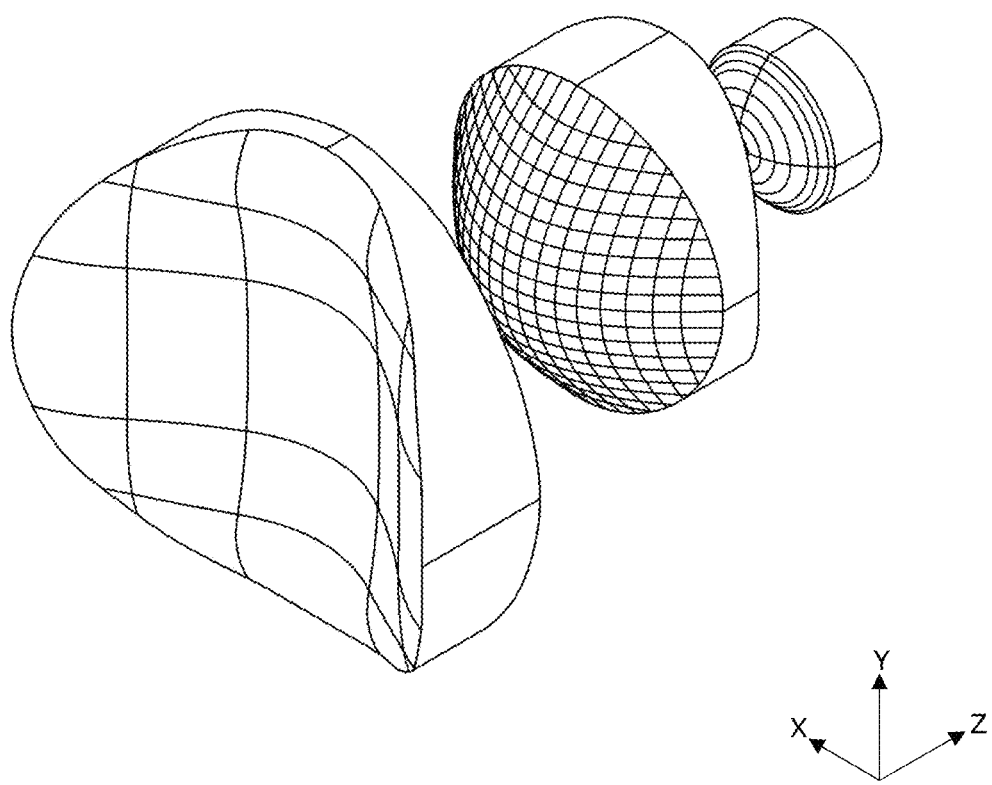
Figure 14:
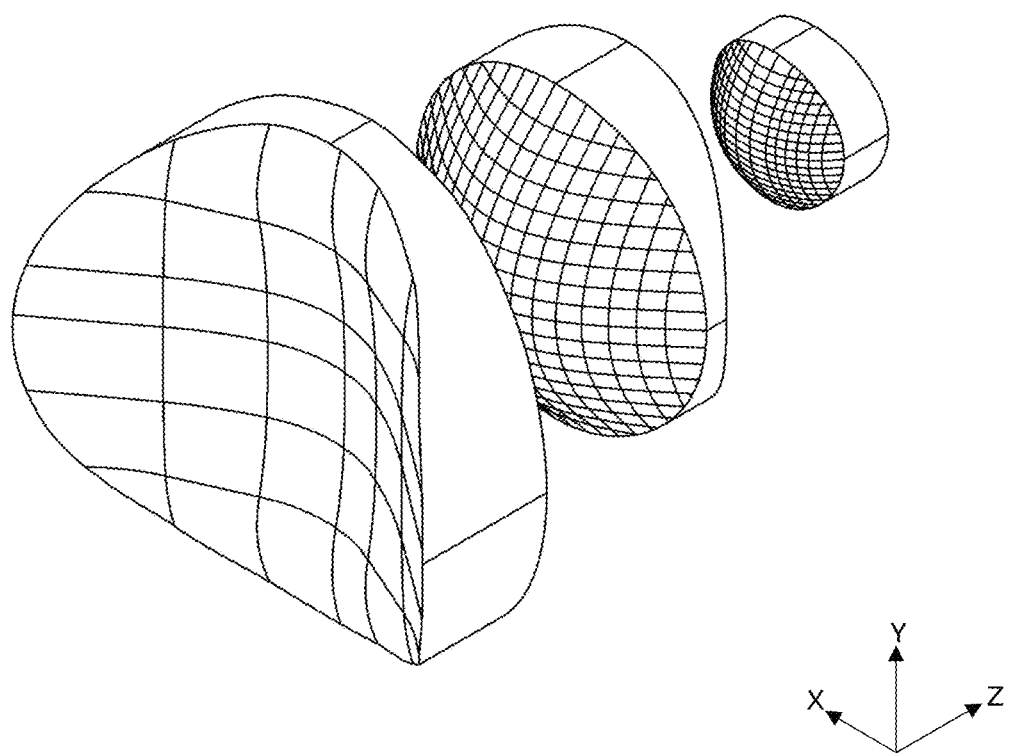

As exemplary embodiments of the optical system formed to satisfy the above conditions, optical systems of FIG. 1 (Embodiment 1), FIG. 5 (Embodiment 2), FIG. 8 (Embodiment 3), FIG. 11 (Embodiment 4), and FIG. 14 (Embodiment 5) will be described. Although the optical system includes three lenses as an example, an optical system may also be configured to form a laterally extending beam pattern using two lenses or four or more lenses.

Figure 3:
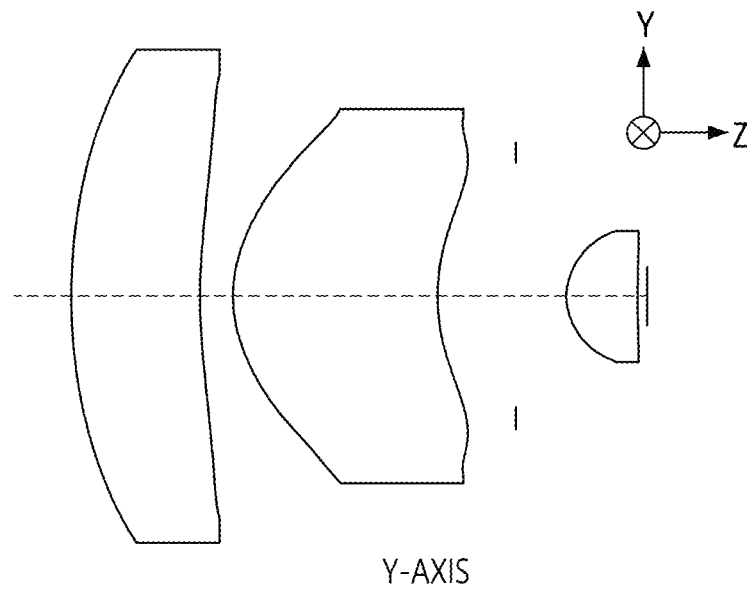
FIG. 3 illustrates vertical and horizontal cross sections of the optical system according to some exemplary embodiments of the present disclosure.
Figure 3:
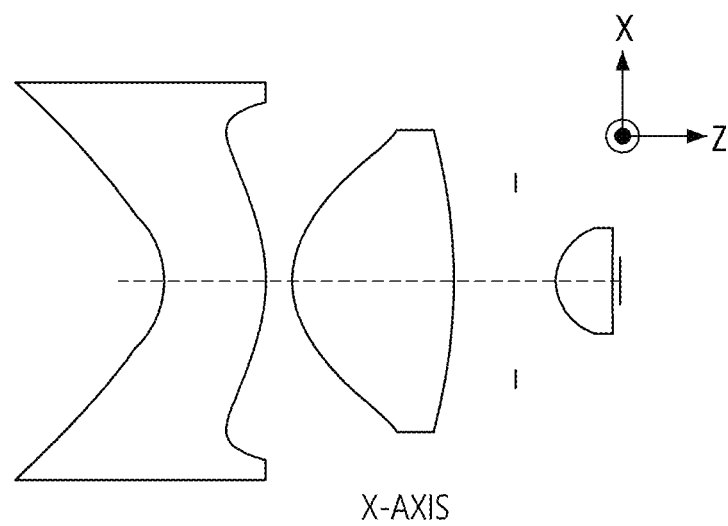

The optical system according to Embodiment 1 may include a shape as shown in FIG. 3 in a horizontal direction and a vertical direction. A first-order value of the optical system according to Embodiment 1 is shown in the following table, Table 1. It may be seen that an NA is 0.7 or more.

TABLE 1

| | Embodiment 1 |
|---|---|
| $FOV_x$ | 10.037° |
| $FOV_y$ | 4.236° |
| $F_x$ | 11.3 mm |
| $F_y$ | 27.12 mm |
| $f_x$ | 20.795 mm |
| $f_y$ | 49.907 mm |
| $f_{fir\_x}$ | 13.207 mm |

TABLE 1-continued

| | Embodiment 1 |
|---|---|
| $f_{fir\_y}$ | 13.207 mm |
| NA | 0.952 |

$FoV_x$ is a half field of view based on an X axis of the optical system and $FoV_y$ is a half field of view based on a Y axis thereof.

Figure 4:
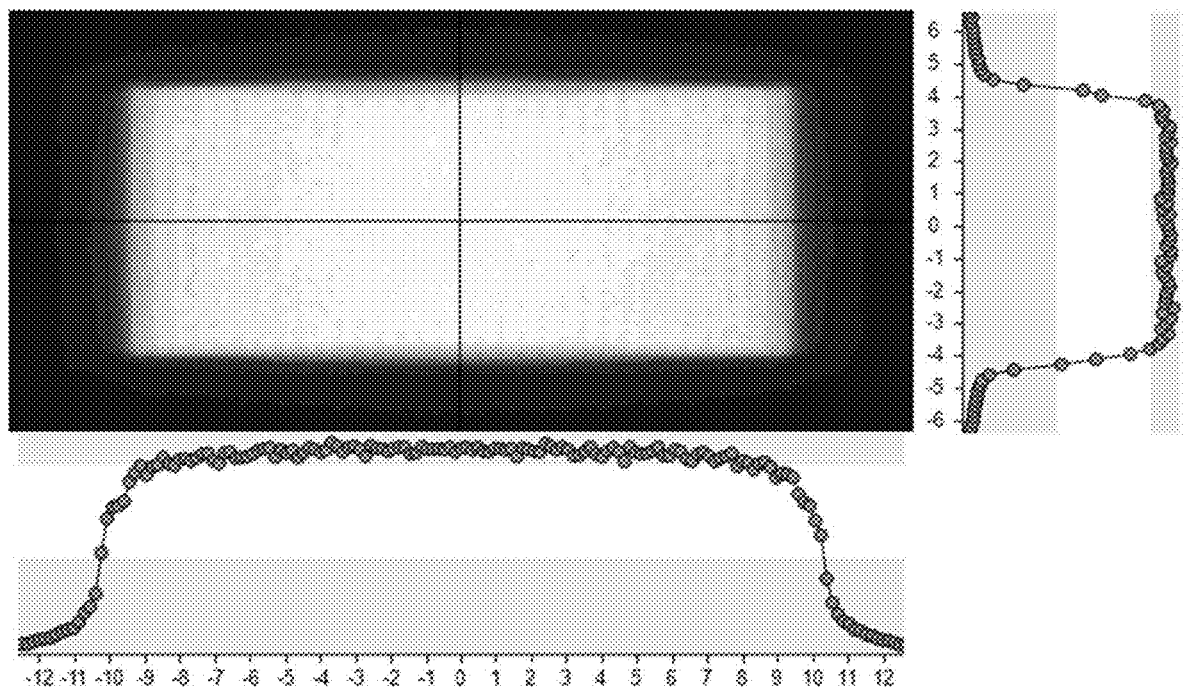
FIG. 4 illustrates light intensity distribution of the optical system according to some exemplary embodiments of the present disclosure.

Light intensity distribution of the optical system according to Embodiment 1 is as shown in FIG. 4. It may be seen that light intensity is distributed such that a lateral length is longer than a vertical length and the light intensity is maintained substantially uniform from a center to an edge.

Figure 6:
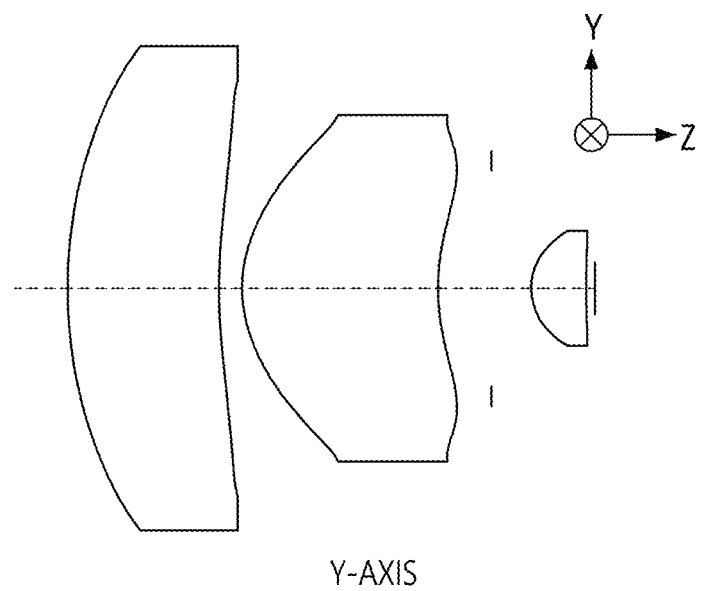
FIGS. 6, 9, 12, and 15 illustrate vertical and horizontal cross sections of the optical system shown in FIGS. 5, 8, 11, and 14.
Figure 6:
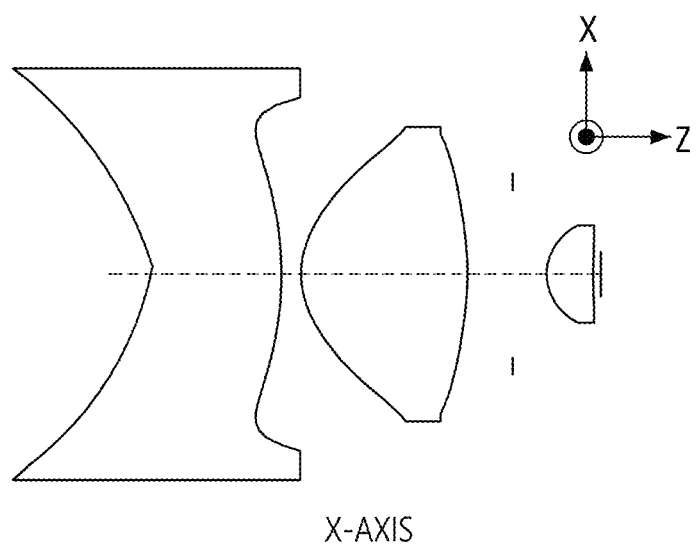

The optical system according to Embodiment 2 may include a shape as shown in FIG. 6 in a horizontal direction and a vertical direction. A first-order value of the optical system according to Embodiment 2 is shown in the following Table 2. It may be seen that an NA is 0.7 or more.

TABLE 2

| | Embodiment 2 |
|---|---|
| FOV_x | 10.037° |
| FOV_y | 4.236° |
| F_x | 11.3 mm |
| F_y | 27.12 mm |
| f_x | 18.52 mm |
| f_y | 44.448 mm |
| ffir_x | 13.636 mm |
| ffir_y | 13.636 mm |
| NA | 0.952 |

Figure 7:
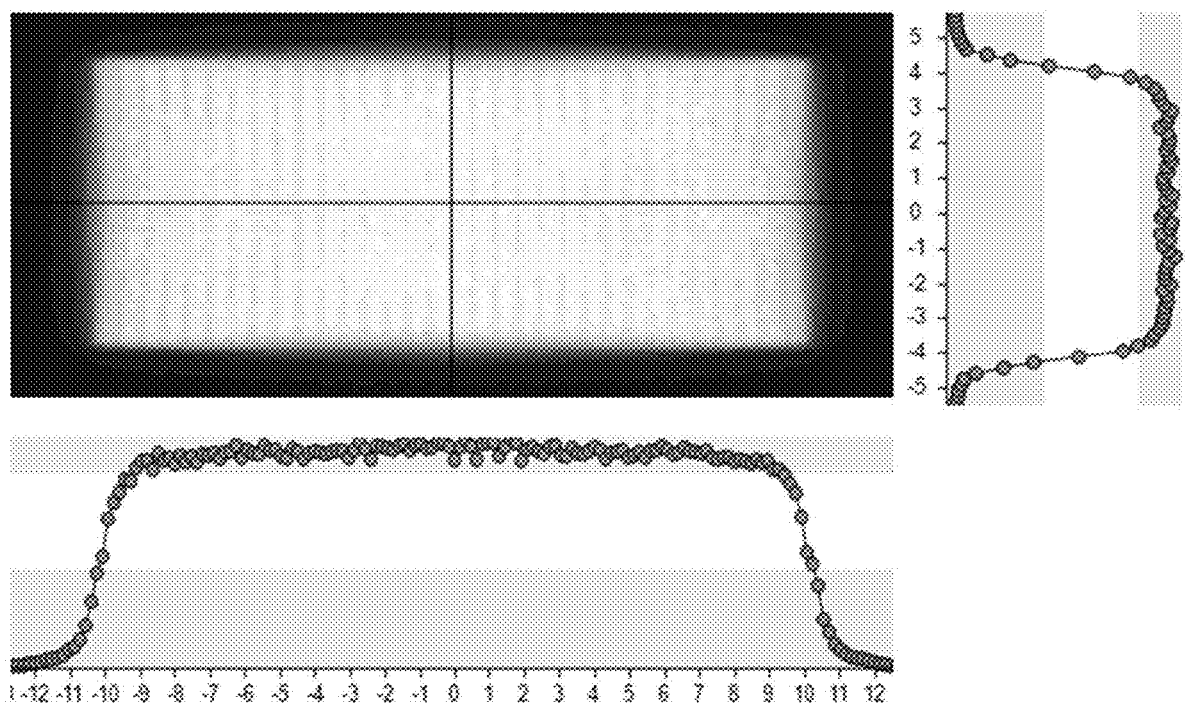
FIGS. 7, 10, 13, and 16 illustrate light intensity distribution of the optical system shown in FIGS. 5, 8, 11, and 14.

Light intensity distribution of the optical system according to Embodiment 2 is as shown in FIG. 7. It may be seen that light intensity is distributed such that a lateral length is longer than a vertical length and the light intensity is maintained substantially uniform from a center to an edge.

Figure 9:
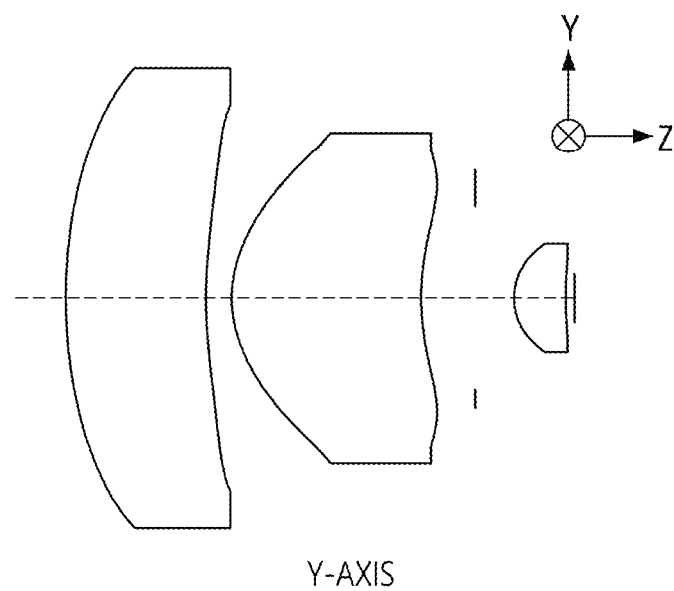
Figure 9:
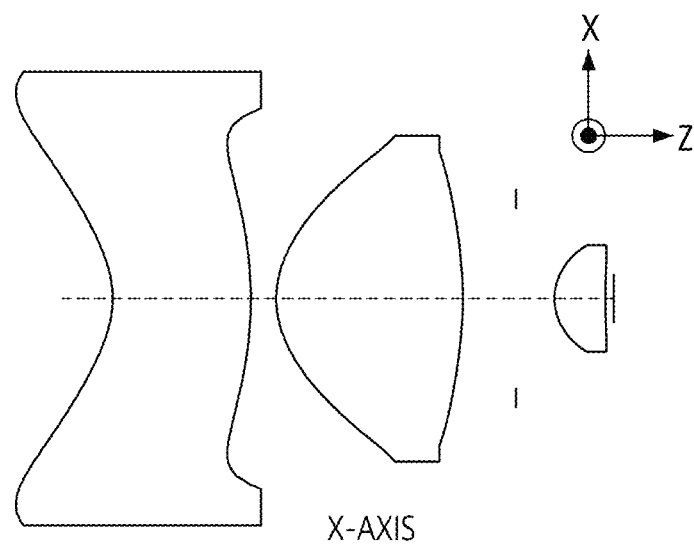

The optical system according to Embodiment 3 may include a shape as shown in FIG. 9 in a horizontal direction and a vertical direction. A first-order value of the optical system according to Embodiment 3 is shown in the following table, Table 3. It may be seen that an NA is 0.7 or more.

TABLE 3

| | Embodiment 3 |
|---|---|
| FOV_x | 10.037° |
| FOV_y | 4.236° |
| F_x | 11.3 mm |
| F_y | 27.1 mm |
| f_x | 19.117 mm |
| f_y | 42.002 mm |
| ffir_x | 12.525 mm |
| ffir_y | 15.03 mm |
| NA | 0.952 |

Figure 10:
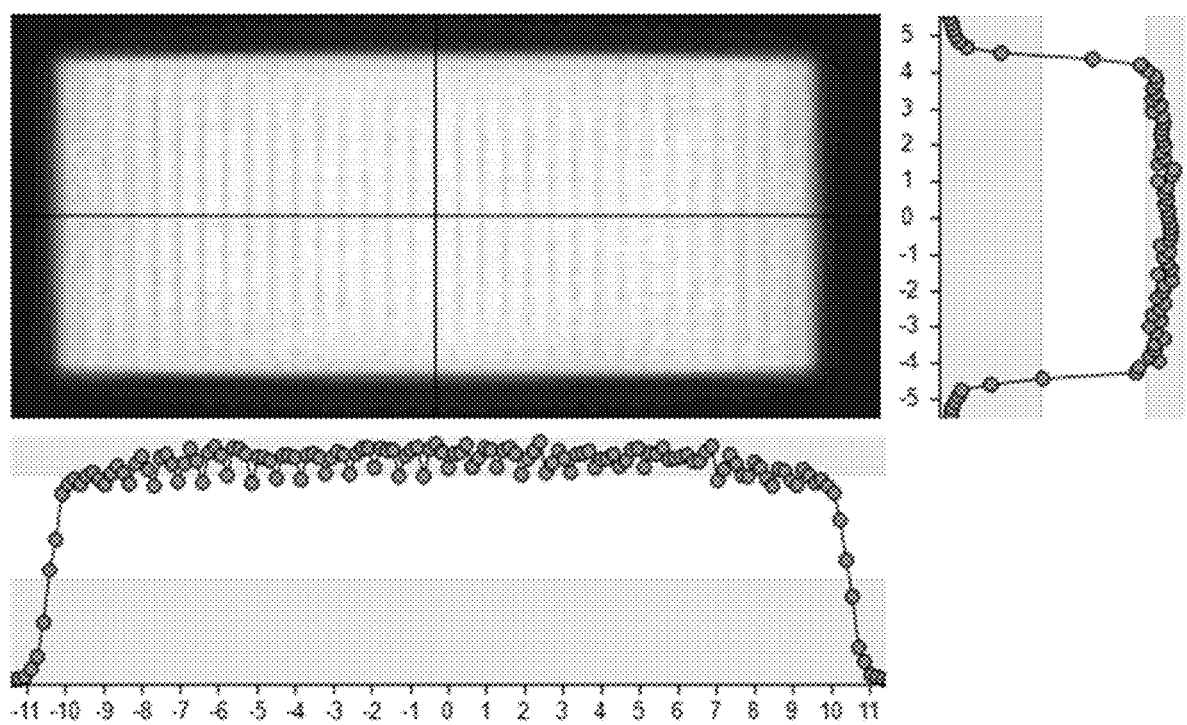

Light intensity distribution of the optical system according to Embodiment 3 is as shown in FIG. 10. It may be seen that light intensity is distributed such that a lateral length is longer than a vertical length and the light intensity is maintained substantially uniform from a center to an edge.

Figure 12:
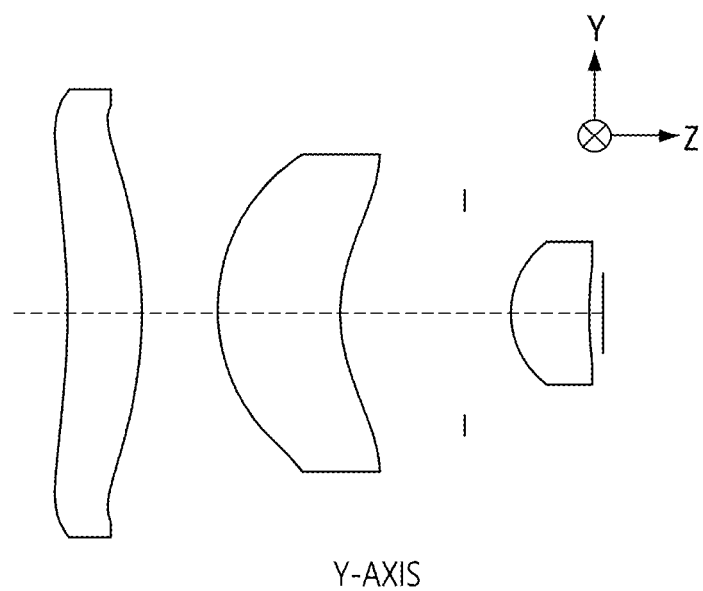
Figure 12:
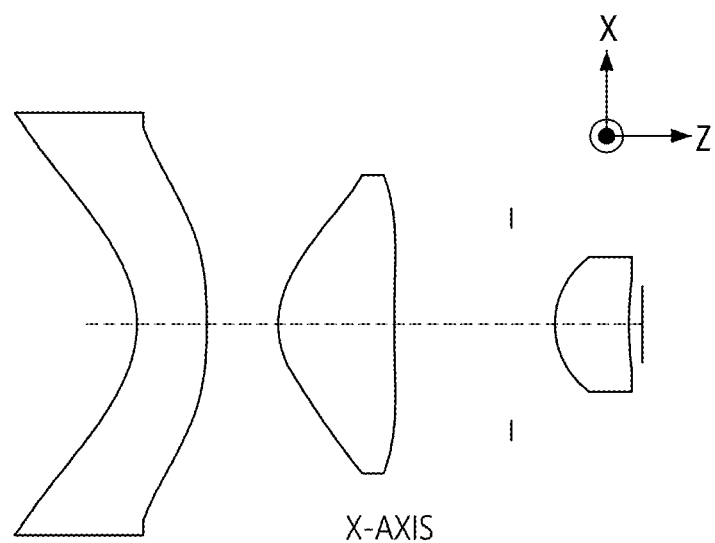

The optical system according to Embodiment 4 may include a shape as shown in FIG. 12 in a horizontal direction and a vertical direction. A first-order value of the optical system according to Embodiment 4 is shown in the following table, Table 4. It may be seen that an NA is 0.7 or more.

TABLE 4

| | Embodiment 4 |
|---|---|
| FOV_x | 20° |
| FOV_y | 5° |
| F_x | 9.6 mm |
| F_y | 22.86 mm |
| f_x | 23.873 mm |
| f_y | 56.848 mm |
| ffir_x | 10.751 mm |
| ffir_y | 10.751 mm |
| NA | 0.9 |

Figure 13:
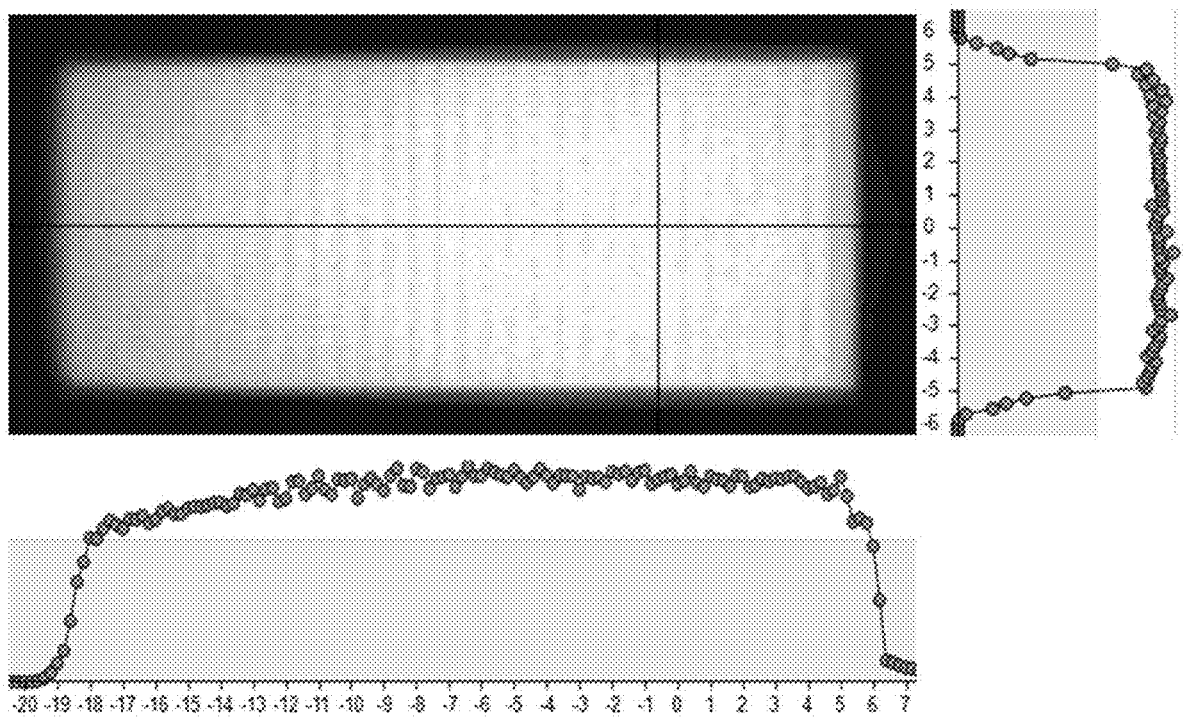

Light intensity distribution of the optical system according to Embodiment 4 is as shown in FIG. 13. It may be seen that a ratio of a lateral length to a vertical length is about 4:1 and light intensity is maintained substantially uniform from a center to an edge.

Figure 15:
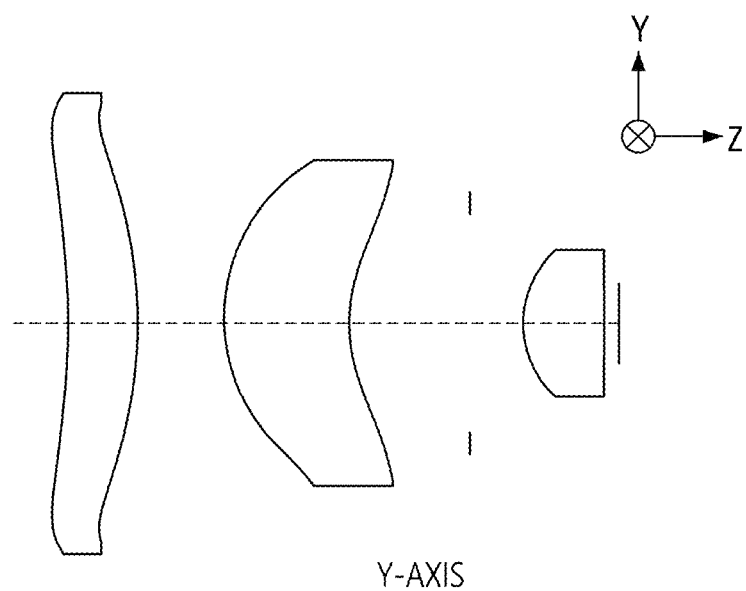
Figure 15:
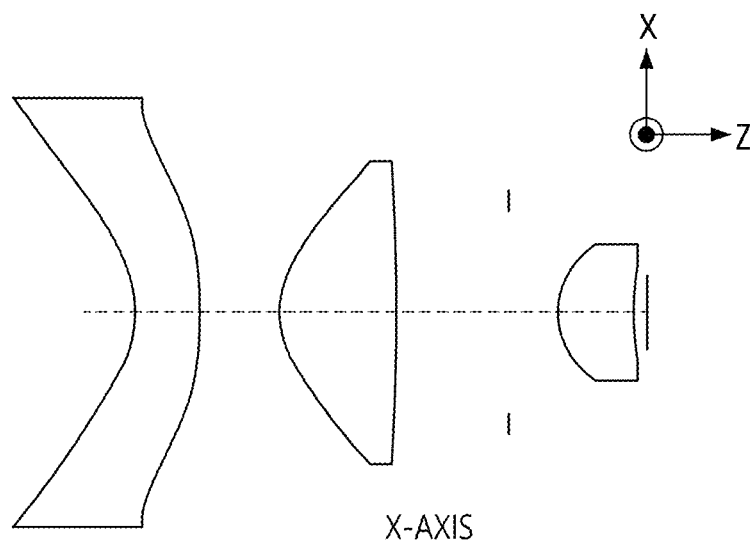

The optical system according to Embodiment 5 may include a shape as shown in FIG. 15 in a horizontal direction and a vertical direction. A first-order value of the optical system according to Embodiment 5 is shown in the following table, Table 5. It may be seen that an NA is 0.7 or more.

TABLE 5

| | Embodiment 5 |
|---|---|
| FOV_x | 17.309° |
| FOV_y | 5.217° |
| F_x | 13.05 mm |
| F_y | 22.858 mm |
| f_x | 28.23 mm |
| f_y | 49.997 mm |
| ffir_x | 13.455 mm |
| ffir_y | 11.436 mm |
| NA | 0.952 |

Figure 16:
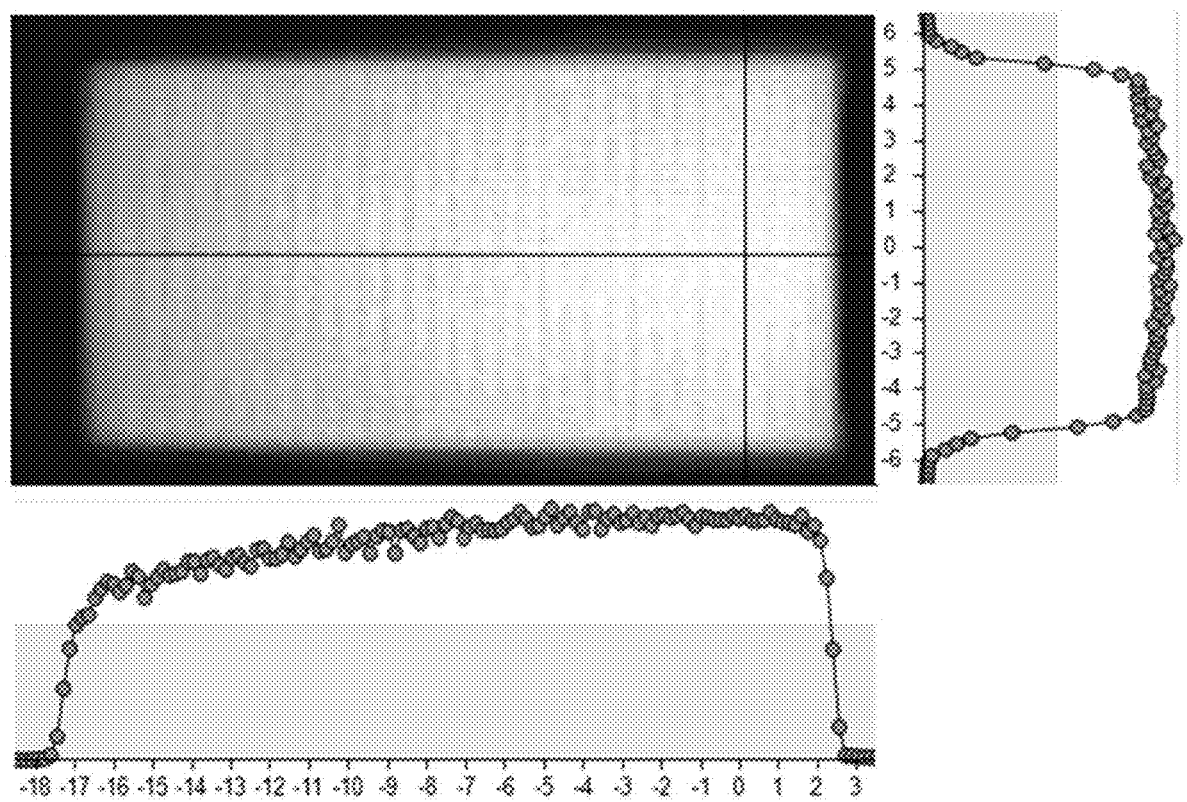

Light intensity distribution of the optical system according to Embodiment 5 is as shown in FIG. 16. It may be seen that a ratio of a horizontal lateral length to a vertical length is about 3:1 and light intensity is maintained substantially uniform from a center to an edge.

Values obtained by Equation 1 to Equation 4 of Embodiment 1 to Embodiment 5 are as follows.

TABLE 6

| | Embodiment 1 | Embodiment 2 | Embodiment 3 | Embodiment 4 | Embodiment 5 |
|---|---|---|---|---|---|
| $\dfrac{F_x}{F_y}$ | 0.4167 | 0.4167 | 0.417 | 0.4199 | 0.5709 |
| $\dfrac{f_x}{F_x}$ | 1.8403 | 1.6389 | 1.6918 | 2.4868 | 2.1632 |
| $\dfrac{f_y}{F_y}$ | 1.8402 | 1.6389 | 1.5499 | 2.4868 | 2.1873 |
| $\dfrac{f_{fir\_x}}{f_{fir\_y}}$ | 1 | 1 | 0.8333 | 1 | 1.1765 |

As shown in Table 6, it may be seen that Embodiment 1 to Embodiment 5 satisfy the conditions according to Equation 1 to Equation 4.

FIGS. 17 to 30 are views illustrating an optical system according to still other exemplary embodiments of the present disclosure. An optical system used for a vehicle may be implemented to have a lateral length of a beam pattern of the vehicle longer than a vertical length. When an image pixel is formed using one light source and generating a distortion such that the lateral length is longer than the vertical length, a rectangular-shaped image pixel may be formed due to one light source without overlapping a plurality of light sources with one another. In a vehicle, a beam pattern, and more particularly, light intensity at or around a center of a high beam may be important. To maintain light intensity greater than or equal to a particular level at the center, a distortion may be minimized at the center and be increased or decreased toward an edge thereof.

Figure 17:
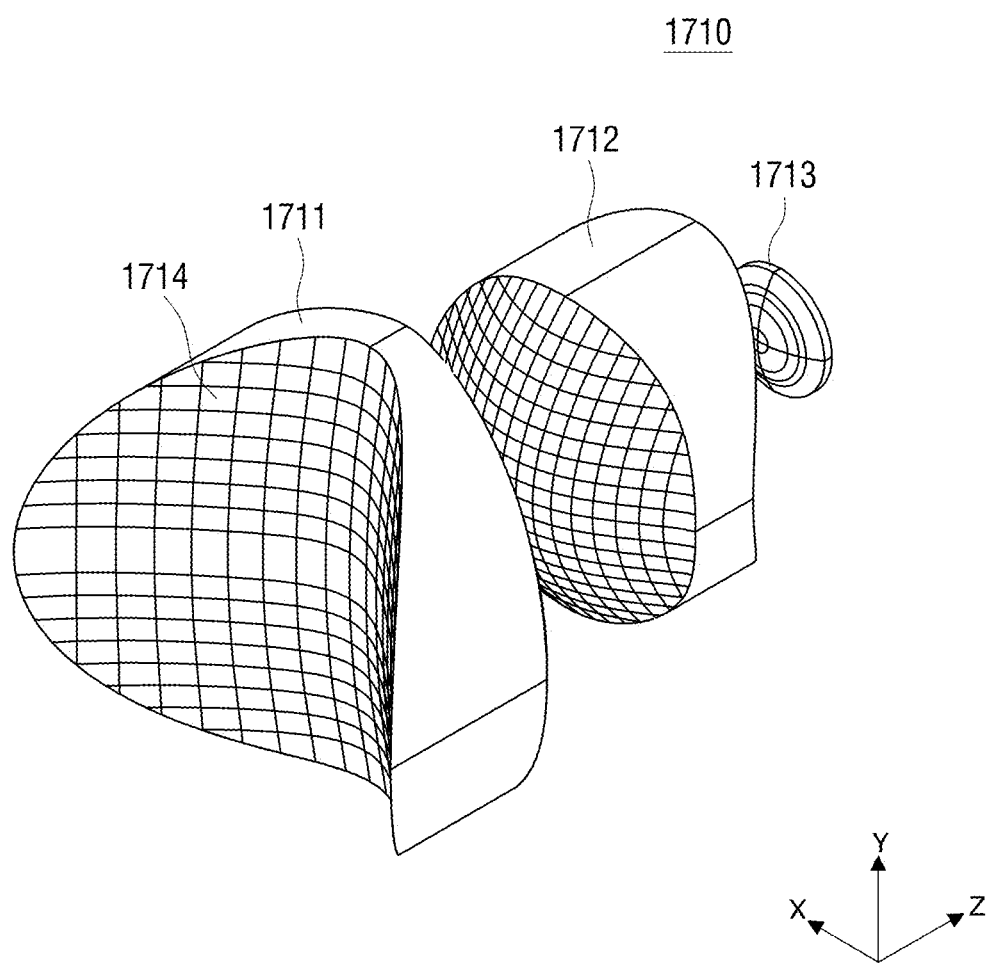
FIG. 17 illustrates an optical system according to still other exemplary embodiments of the present disclosure.

To generate a distortion as described above, the optical system according to still other exemplary embodiments of the present disclosure may include a plurality of lenses and generate a distortion such that a size of an image pixel formed by light that passes through the lenses may increase or decrease to be gradually distorted from a center toward an edge. As shown in FIG. 17, when a light source is disposed on a rear side of a lens 1713 and emits light, the light emitted by the light source may sequentially pass through a plurality of lenses 1713, 1712, and 1711 and may be emitted toward an anamorphic surface 1714 of the optical system. An optical system may be implemented to generate a distortion such that a pixel size of an image formed by the light emitted toward the anamorphic surface 1714 may gradually increase from a center toward an edge to be distorted. Further, when the light source is disposed on a front side of the anamorphic surface 1714 and emits light, the light emitted by the light source may be incident on the anamorphic surface 1714, sequentially pass through the plurality of lenses 1711, 1712, and 1713, and be emitted. Accordingly, a distortion, in which a pixel size of an image formed by the emitted light may decrease to be gradually distorted from a center toward an edge, may be generated.

Figure 18A:
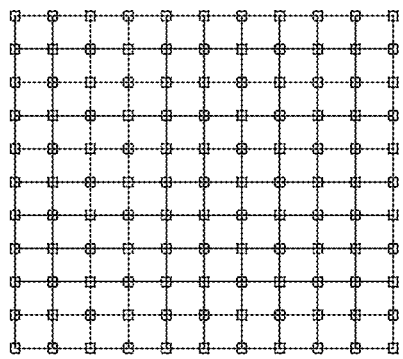
FIGS. 18A and 18B illustrate images formed passing through the optical system of FIG. 17 according to still other exemplary embodiments of the present disclosure.
Figure 18A:
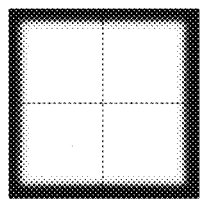
Figure 18B:
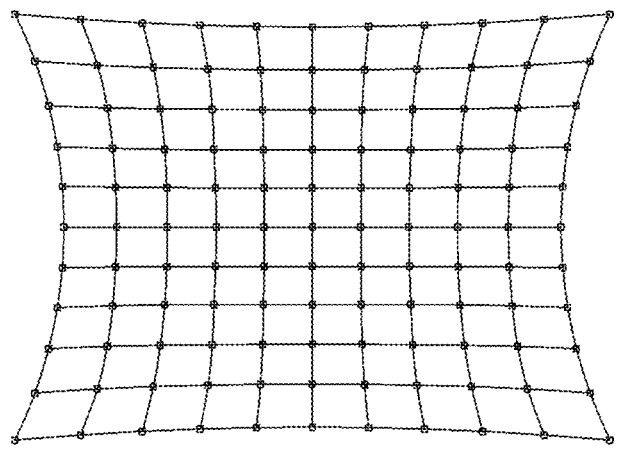
Figure 18B:
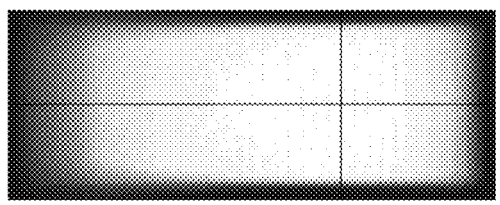

Due to the distortion, the pixel size of the image may gradually increase toward a right, left, upper, or lower edge. The distortion may be generated on the left and right, top and bottom, or top, bottom, left, and right. In a distortion generated in a lateral direction as shown in FIGS. 18A and 18B, when an image formed by light passing through an optical system (square optical system) without a distortion is as shown as FIG. 18A, an image may be formed as shown in FIG. 18B when light passes through an optical system which generates a distortion such that a size thereof may increase to be gradually distorted from a center toward left and right edges. In FIG. 18A, a size of a pixel may be equal at the center and on the edge. In FIG. 18B, a lateral size of an image pixel may gradually increase from the center toward left and right edges. In other words, a beam pattern may be formed, in which a lateral length necessary for a vehicle optical system is longer than a vertical length and in which a size of a pixel decreases at the center while maintaining light intensity and increases toward the edge to increase the lateral length.

To generate a distortion in a lateral or vertical direction, a level of a horizontal distortion and a level of a vertical distortion may be embodied to be different from each other. In the case of the distortion having a laterally extending shape as shown in FIG. 18B, the level of the horizontal distortion may be formed to be higher than the level of the vertical distortion. When the optical system is rotated 90 degrees, the level of the vertical distortion may be formed to be higher than the level of the horizontal distortion.

The distortion may be generated according to a shape of the anamorphic surface 1714. Since an effect caused by the shape of the anamorphic surface, from which light having passed through the optical system is emitted, is substantial, the distortion may be generated by adjusting the shape of the anamorphic surface 1714.

To form the level of the horizontal distortion and the level of the vertical distortion to be different from each other, a horizontal field of view and a vertical field of view may be made to be different from each other. For example, the optical system may employ an anamorphic surface which has lateral and vertical symmetries with respect to a horizontal (long side) and a vertical (short side) instead of rotational symmetry.

To form the anamorphic surface, the anamorphic surface 1714 of the optical system may have a saddle shape which is horizontally concave and vertically convex or horizontally convex and vertically concave. For an anamorphic optical system, since a vertical field of view and a horizontal field of view are different from each other, to increase the horizontal field of view and decrease the vertical field of view, a negative focal length may be embodied by forming the anamorphic surface 1714 to be concave toward a light emission surface in a horizontal direction. On the other hand, a positive focal length may be embodied by forming the anamorphic surface 1714 to be convex toward the light emission surface in a vertical direction. Accordingly, the anamorphic surface 1714 may be formed to have a saddle surface shape which is concave in the horizontal direction and convex in the vertical direction.

Other surfaces of the optical system except the anamorphic surface may be formed to be convex, concave, or a saddle shape. In the case of three lenses, the anamorphic surface may have a saddle shape, a third surface may have a convex shape, a fifth surface may have a convex shape, and a sixth surface may have a plane shape. The sixth surface may be formed to be a substantially plane shape although it may be convex or concave. The second surface and the fourth surface may be formed to be convex or concave.

To form the image as shown in FIG. 18B by generating the horizontal distortion and the vertical distortion which are different from each other, the anamorphic surface 1714 of an optical surface may be formed such that a horizontal curvature and a vertical curvature are different from each other. Accordingly, a horizontal focal length and a vertical focal length may be formed to be different from each other to have a horizontal field of view and a vertical field of view which are different from each other. For example, an anamorphic surface las of the optical system may be formed such that a horizontal curvature and a vertical curvature satisfy the following equation (Equation 5).

$$-18.4 \leq \frac{c_{las\_x}}{c_{las\_y}} \leq 6.3 \qquad \text{Equation 5}$$

where c is a curvature. $C_{las\_x}$ is a horizontal curvature of the anamorphic surface (las), and $C_{las\_y}$ is a vertical curvature of the anamorphic surface (las).

Figure 22A:
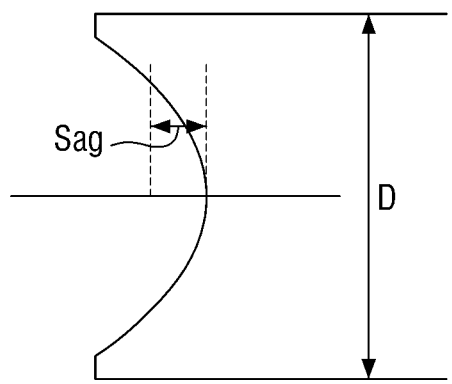
FIGS. 22A, 22B, and 22C are views illustrating an equation indicating properties of the optical system of FIG. 17 according to still other exemplary embodiments of the present disclosure.

In particular, the curvature of the optical system may be determined from a sag value near a center of a lens surface. A paraxial ray-tracing may be used in determining a first-order value, such as a focal length and the like, of the optical system. An optical surface in the paraxial ray-tracing may be calculated while being approximated by a paraboloid having a minimal sag value. Further, since the curvature of the optical system is calculated near a peak, the curvature and the sag value may be proportional to each other as shown in an the following equation (Equation 6).

$$z = \frac{1}{2} c \cdot s_{0.1}^2 \qquad \text{Equation 6}$$

where s refers to a sag value and $s_{0.1}$ is a sag value from a center of a lens to 1/10 of a height of the lens. $S_{0.1}$ may be calculated as shown in FIG. 22A.

Accordingly, the anamorphic surface (las) of the optical system may be formed to satisfy the following equation (Equation 7).

$$-5767.4 \leq \frac{z_{las\_x}}{z_{las\_y}} \leq 256.8 \qquad \text{Equation 7}$$

As shown in Equation 6, since a curvature and z are proportional to each other, Equation 5 and Equation 7 may have the substantially same physical meaning. To embody a narrow field of vision in a general optical system, a telephoto type shape of a positive lead may be used. To embody a wide angle, a retro-focus type shape of a negative lead may be used. Equations 5 and 7 may determine a refractive power of an anamorphic surface and may be one of elements which determine shapes of an optical system in a horizontal direction and a vertical direction. An upper limit, a sign of which is a positive number, may mean that horizontal and vertical refractive forces have the same signs. When the upper limit value is exceeded, it may be difficult to have a retro-focus type shape for embodying a wide angle or difficult to have a telephoto type shape for embodying a narrow field of vision. Since the shape of the lens has horizontal and vertical convex surfaces, an anamorphic ratio may be increased. In addition, when a lower limit value is exceeded, horizontal and vertical refractive powers may be biased in a particular direction. In this case, a shape of a first lens may collapse and lose a value as a product. For example, a horizontal curvature may become too small such that an edge part of a lens may increase and processability of the lens may become worse.

A ratio of a width to a length of an image pixel on which light is formed may be determined from the above-described conditions of Equation 5 and Equation 6. However, when the curvature or a z value is adjusted and also a distortion of an optical system is used, it may be possible to adjust the ratio of the width to the length of the image pixel on which the light is formed to adjust energy density. Accordingly, light intensity of the image pixel on which the light is formed may be adjusted to allow the light source to be used more efficiently.

A distortion may be generated using an aspherical effect. The distortion may be adjusted by utilizing an aspherical coefficient, and an aspherical coefficient and a distortion according to a third-order (Seidel) aberration are shown as follows.

$$S_V^* = (Kc^3 + 8A)(n_i - n_{i-1}) h_i \bar{h}_i^{-3} \qquad \text{Equation 8}$$

Figure 22B:
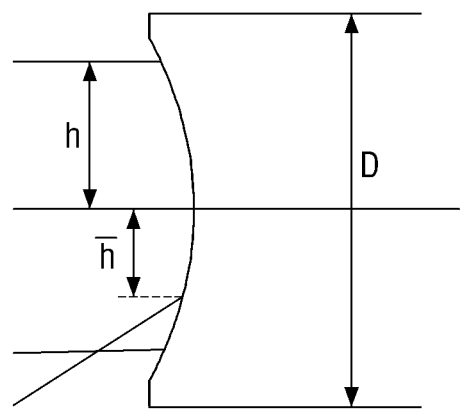

$S_V$ is the third-order (Seidel) aberration, K is a conic constant, c is curvature, A is a fourth-order constant, $n_i$ is a refractive index, and $n_{i-1}$ is a refractive index of a medium in front of a lens surface. $H_i$ is a height of an axial ray of an i-th surface, and $\bar{h}_i$ is a height of a principal ray of the i-th surface. The Seidel's aberration may relate to a distortion and may indicate which lens surface corresponds to which distortion. When a value of $S_V$ is positive (+), an effect may be made to allow a distortion value to approach from the current distortion state toward a + side. When $S_V$ is negative (−), an effect may be made to allow a distortion value to approach toward a − side. The axial ray may refer to a ray that is emitted from a center of an object and is incident in parallel to an optical axis when a distance between an optical system and the object is close to infinity. The principal ray may refer to a ray which passes through a center of an aperture among skew rays which are incident, not in parallel, to the optical axis. A height of the axial ray and a height of the principal ray on the anamorphic surface 1714 may be approximate to a diameter of a lens as shown in FIG. 22B. Since the diameter of the lens increases as a height of a ray increases, the height of the principal ray and the height of the axial ray may approach the diameter of the lens. Accordingly, when a conic constant K of an anamorphic surface and a fourth-order aspherical constant A are adequately adjusted, a distortion of an optical system may obtain a desired value.

Since the distortion receives effects from the conic constant K and the curvature C, to form a distortion by adjusting the conic constant K, the anamorphic surface (las) of the optical system may be formed to satisfy the following equation (Equation 9).

$$0.7 \times 10^{-9} \leq \frac{K_{las\_x} c_{las\_x}^3}{D_{las}^4} \leq 1.65 \times 10^{-8} \qquad \text{Equation 9}$$

Further, since the distortion receives an effect of the fourth-order aspherical constant A, to form the distortion by adjusting the fourth-order aspherical constant, the anamorphic surface (las) of the optical system may be formed to satisfy the following equation (Equation 10).

$$0.7 \times 10^{-10} \leq \frac{8 A_{las\_x}}{D_{las}^4} \leq 1.3 \times 10^{-9} \qquad \text{Equation 10}$$

To generate a horizontal distortion or to generate a vertical distortion, a ratio between horizontal aspherical constants and vertical aspherical constants of the anamorphic surface may be made to be substantial.

Equation 9 and Equation 10 relate to a value of a distortion caused by an aspherical surface. When the value becomes excessively smaller than a lower limit, a distortion may be too small to make a difference between a central part and a peripheral area. On the other hand, when the value is higher than an upper limit, a distortion may be excessive in comparison to a field of view such that an optical system may be difficult to design.

Accordingly, the anamorphic surface (las) of the optical system may be formed to satisfy the following equation (Equation 11).

$$4.5 \leq \frac{K_{las\_x} c_{las\_x}^3 + 8 A_{las\_x}}{k_{las\_y} c_{las\_y}^3 + 8 A_{las\_y}} \leq 210 \qquad \text{Equation 11}$$

Equation 11 is a condition which relates to a distortion of a TV screen. While a substantial distortion is generated under the conditions of Equations 10 and 11, when the distortion is horizontally great and vertically small, spacing between pixels of an image on which light is formed in a horizontal direction may be adjusted. Accordingly, when the distortion is less than a lower limit of Equation 11, a distortion may be generated minimally in a vertical direction, which may be difficult to embody in design. When the distortion exceeds an upper limit, a distortion may increase also in a vertical direction to cause an overall image pixel area to deviate from a rectangular shape.

As described above, the anamorphic surface 1714 may be formed to satisfy the conditions of Equations 5 to 11 to generate a distortion such that a pixel size of an image on which light is formed may gradually increase from a center to lateral edges.

An optical system 1710 may be formed such that an NA is greater than or equal to 0.7. The NA may be a value which refers to brightness. To embody an NA of an optical system having high light efficiency of 0.7 or more, a last lens disposed near the light source may include a lens which has a positive focal length, and a curvature diameter of a front surface of the corresponding lens may be smaller in comparison to a curvature diameter of a rear surface thereof. The last lens may increase efficiency of the optical system by reducing a diffusion angle of light diffused in an LED as the light source.

To increase efficiency of the LED as the light source, an optical system may be implemented to have a large NA. In the optical system, a lens having a high refractive force may be inserted as the last lens 1713 closest to a top surface to increase or decrease the NA. For a general lens to have a great refractive power, a value of curvature may be increased. As the curvature increases, a thickness of the lens may also increase. Accordingly, when a thickness of a lens is restricted in comparison to an effective diameter of the last lens 1713 of the optical system to be less than a lower limit in the present disclosure, it may be difficult to form a shape of a lens having a refractive power to increase an NA. When an upper limit is exceeded, a thickness of a lens may become thick, and a distance between a last surface and a top surface may become too small. Accordingly, it may be difficult to manufacture a product.

Figure 22C:
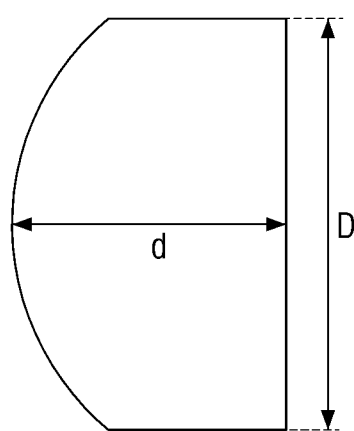

To increase efficiency of the optical system, the first lens 1713 of the optical system on which the light is incident may be formed to satisfy the following equation (Equation 12).

$$0.75 \leq \frac{d_{first}}{D_{first}} \leq 1.45 \quad \text{Equation 12}$$

where, as shown in FIG. 22C, d is a thickness of a lens, and D is a diameter of a lens.

Equation 12 is a condition related to a size of the last lens 1713. When the last lens 1713 is too thin, since it is difficult to embody a small curvature such that the NA of the optical system is decreased, increasing efficiency may be limited. Since a material cost of the lens is high and a large amount of time is consumed to inject the lens in an opposite case, the last lens 1713 may be formed to satisfy the condition of Equation 8.

To increase efficiency of the optical system 1710, a diffusion angle which starts from the light source may be decreased. Further, color aberration may also be prevented. Accordingly, it may be necessary to form an Abbe number of a material of the lens 1713 closest to the light source of the optical system to be greater than or equal to 45. Since a material having a high Abbe number has a minimal variation in a refractive index across the wavelengths, occurrence of color aberration may be suppressed.

Further, all lenses included in the optical system may be formed to have a mean refractive index of 1.6 to 1.8. Here, the mean refractive index may refer to a mean refractive index of a d-line. When the mean refractive index of the all lenses increases as described above, correction of astigmatism and curvature of image field may be facilitated. However, when the mean refractive index increases excessively, absorption of a material may increase to decrease transmittance of the optical system. In this case, the efficiency of the optical system may decrease.

As exemplary embodiments of the optical system to satisfy the conditions, optical systems of FIG. 17 (Embodiment 6), FIG. 23 (Embodiment 7), and FIG. 27 (Embodiment 8) will be described. Although the optical system includes three lenses as an example, an optical system, in which sizes of image pixels in a center and an edge are different from each other due to the distortion, may be configured by using two lenses or four or more lenses.

Figure 19:
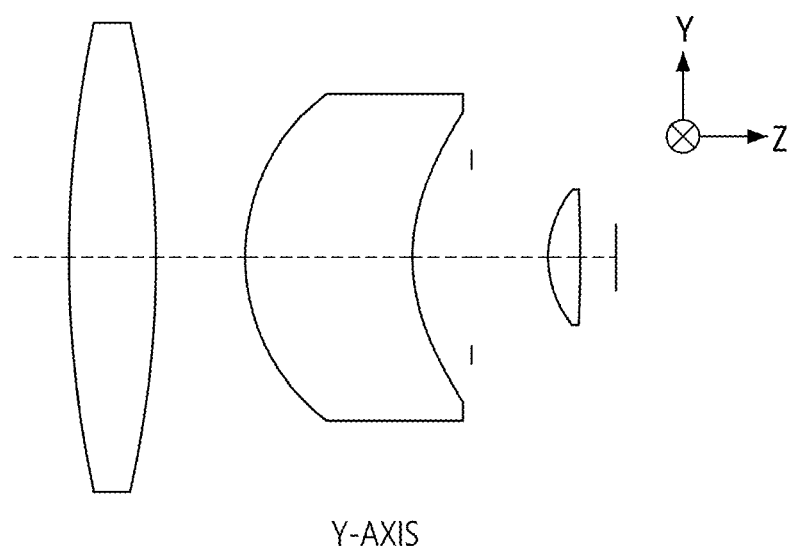
FIG. 19 illustrates vertical and horizontal cross sections of the optical system of FIG. 17 according to still other exemplary embodiments of the present disclosure.
Figure 19:
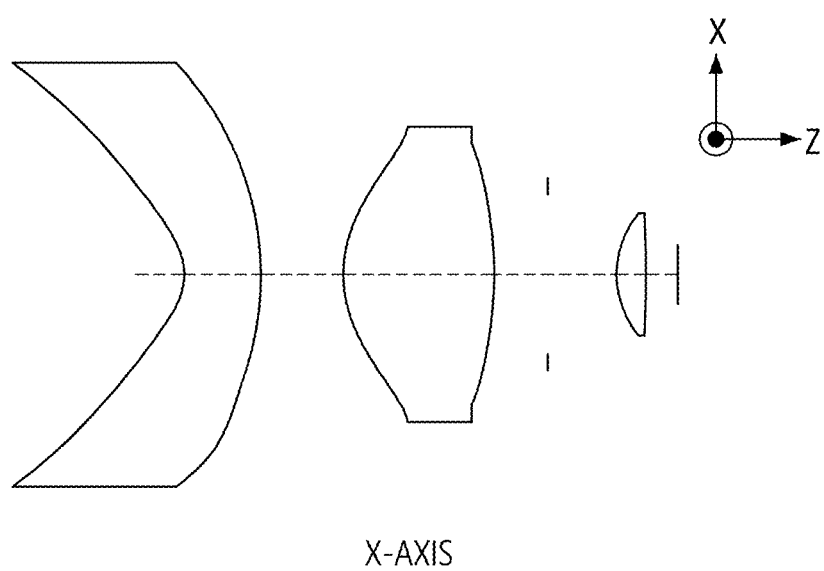
Figure 20:
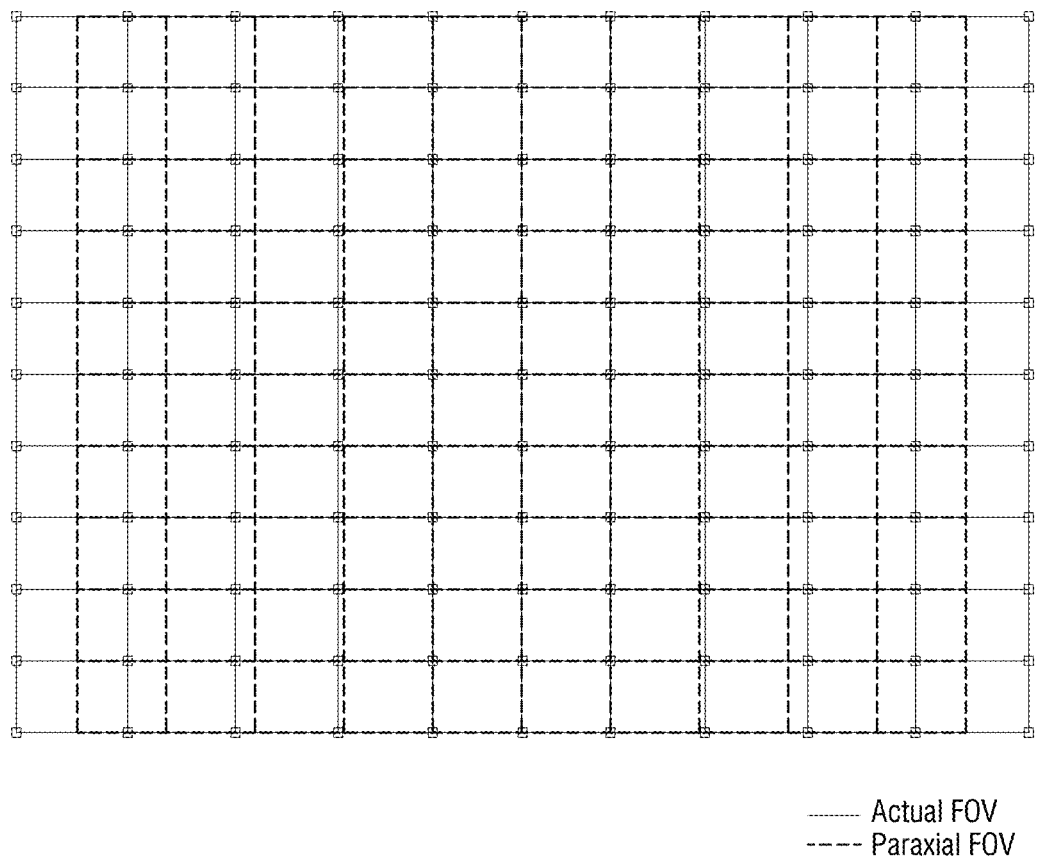
FIG. 20 illustrates a distorted grid of the optical system of FIG. 17 according to still other exemplary embodiments of the present disclosure.
Figure 21:
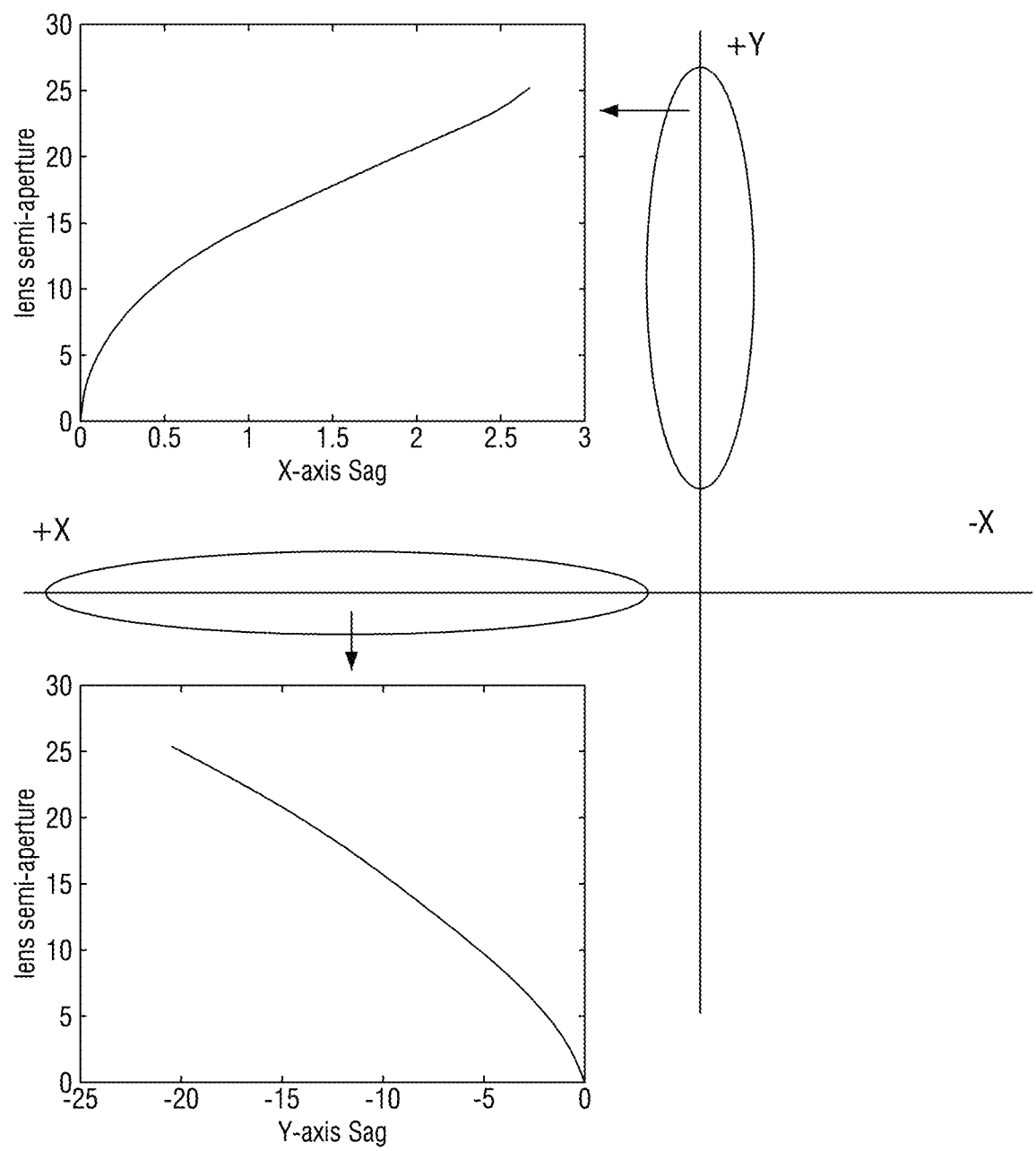
FIG. 21 illustrates a shape of a first lens of the optical system of FIG. 17 according to still other exemplary embodiments of the present disclosure.

Cross-sectional views of Embodiment 6 in a horizontal direction (X-axis) and a vertical direction (Y-axis) are shown in FIG. 19. FIG. 20 illustrates a distorted grid generated when light is emitted toward the anamorphic surface. It may be seen that a distortion is generated in lateral edges in a horizontal direction. When a distortion is generated in the optical system, an image of the top surface may change. When a distortion value moves toward positive (+), a pincushion distortion may be generated. When the distortion value moves toward negative (−), a barrel distortion may be generated. On the other hand, when light is diffused and passes through from the top surface toward the optical system in which a distortion is generated, an image may be formed in a distorted shape having an opposite sign value to a shape of the distortion generated on the top surface. In the optical system in which the distortion is generated, since the distortion of the top surface is negative (−), a barrel distortion may be generated, and the image formed by the light passing through and emitted toward an anamorphic surface may be inverted and have a pincushion distortion as shown in FIG. 20. FIG. 21 illustrates a shape of an anamorphic surface of Embodiment 6, which is formed as an aspherical surface and generates a distortion as shown in FIG. 21. Aspherical data with respect to the anamorphic surface which is the aspherical surface of Embodiment 6 is as follows.

TABLE 7

|  | Embodiment 6 |
| --- | --- |
| Clas_x | −0.148 |
| Clas_y | 0.00803 |
| S0.1 las_x | −0.453 |
| S0.1 las_y | 0.0256 |
| Klas_x | −2.0493 |
| Alas_x | 9.60E−06 |
| Dlas | 25.1843 |
| dfirst | 3.5014 |
| Dfirst | 7.2733 |

A first-order value according to the optical system of Embodiment 6 is as follows.

TABLE 8

|  | Embodiment 6 |
| --- | --- |
| EFL_x | 11.16 mm |
| EFL_y | 28.6 mm |
| NA_x | 0.7 |
| NA_y | 0.7 |
| FOV_x | 16° |
| FOV_y | 4° |
| Distortion_x | −12% |
| Distortion_y | −1% |

Figure 23:
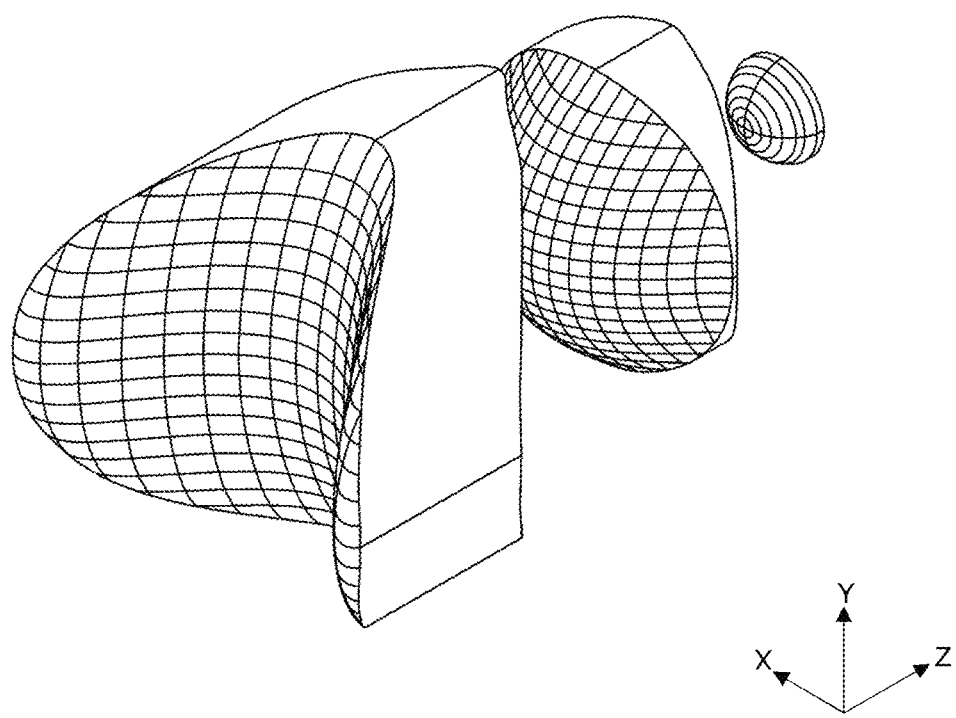
FIGS. 23 and 27 illustrate an optical system according to other exemplary embodiments of the present disclosure.
Figure 24:
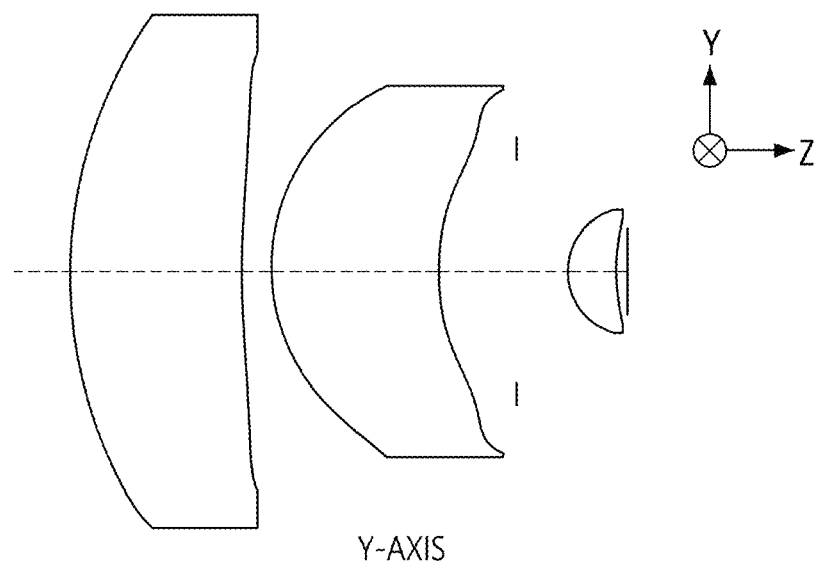
FIGS. 24 and 28 illustrate vertical and horizontal cross sections of the optical system according to other exemplary embodiments of the present disclosure.
Figure 24:
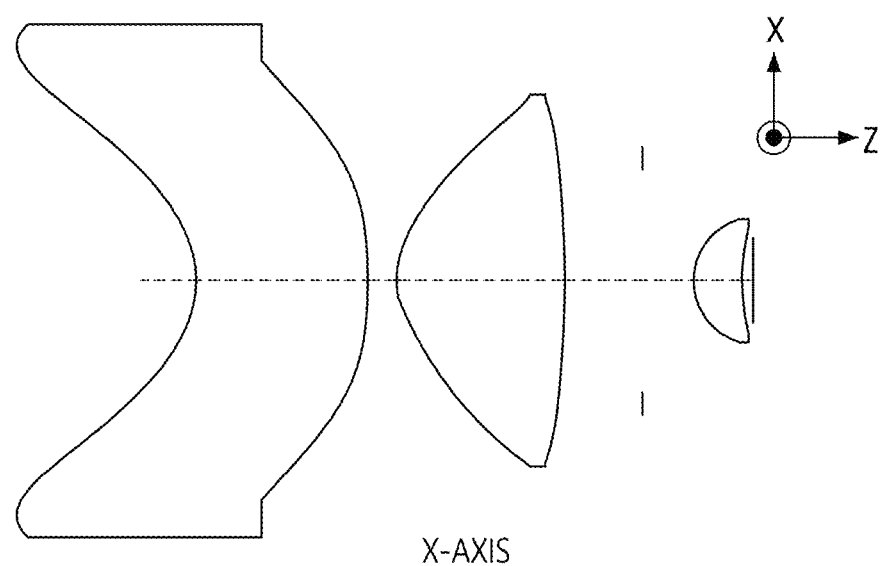
Figure 25:
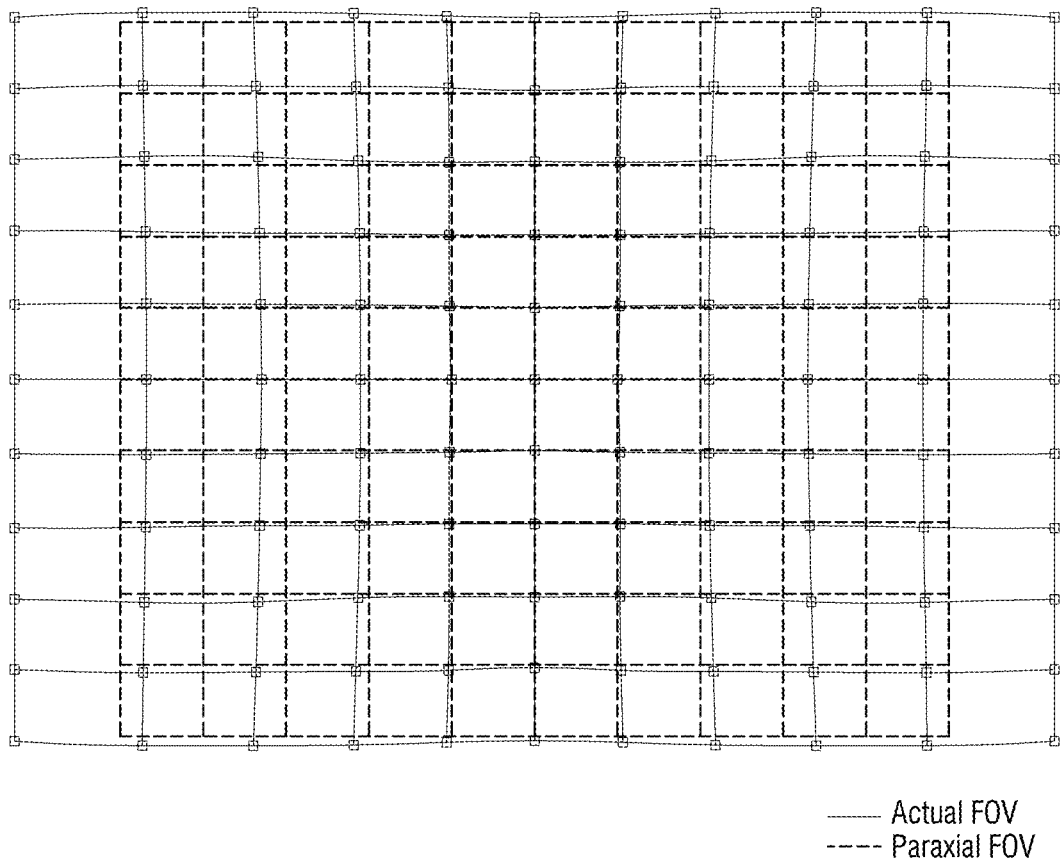
FIGS. 25 and 29 illustrate a distorted grid of the optical system according to other exemplary embodiments of the present disclosure.
Figure 26:
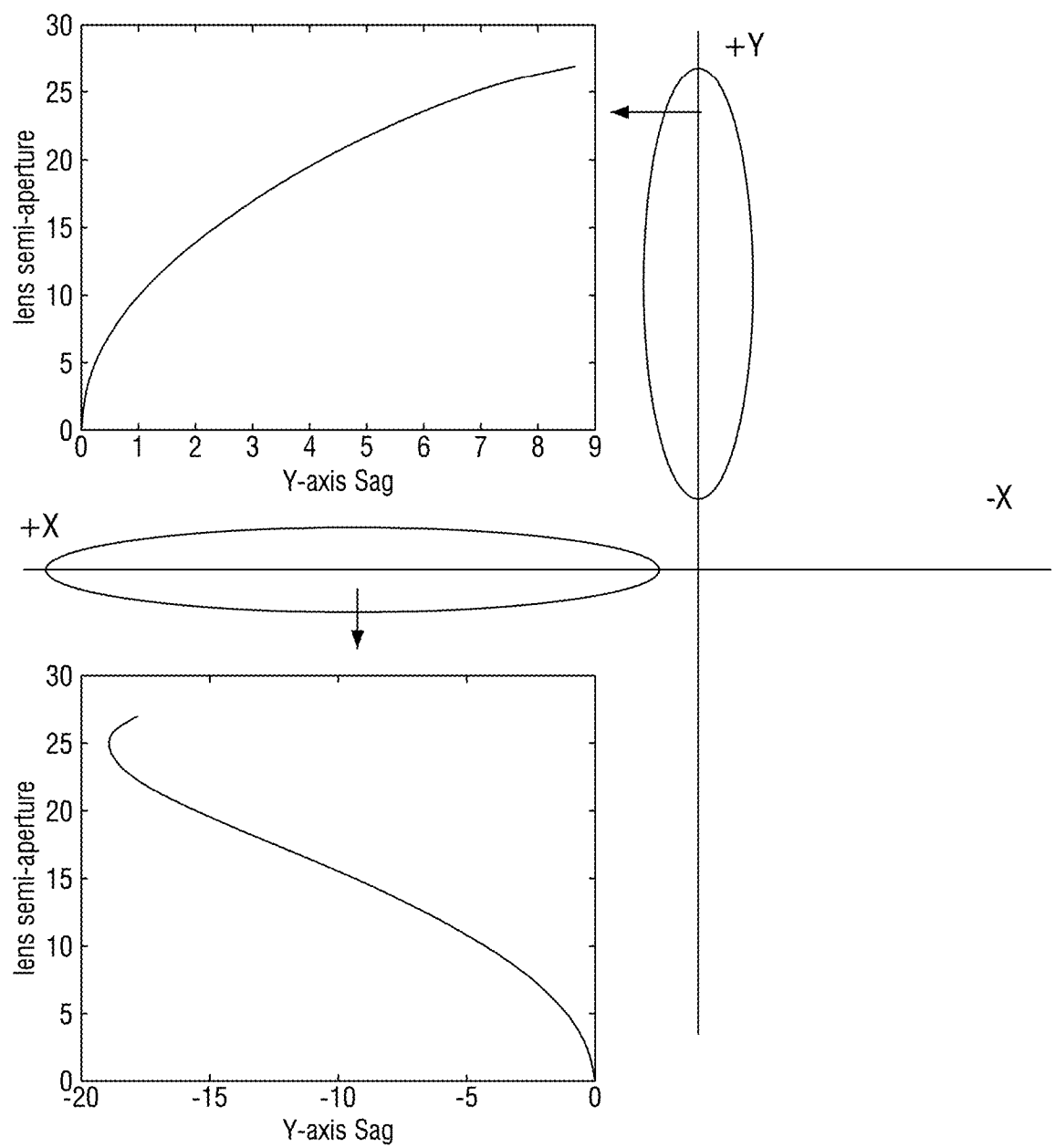
FIGS. 26 and 30 illustrate a shape of a first lens of the optical system according to other exemplary embodiments of the present disclosure.

Embodiment 7 may include a shape shown in FIG. 23, and horizontal and vertical cross-sectional views thereof are shown in FIG. 24. FIG. 25 illustrates a distorted grid generated when light is emitted toward the anamorphic surface. It may be seen that a distortion is generated in lateral edges in a horizontal direction. FIG. 26 illustrates a shape of an anamorphic surface of Embodiment 7, which is formed as an aspherical surface and generates a distortion as shown in FIG. 26. Aspherical data with respect to the anamorphic surface which is the aspherical surface of Embodiment 7 is as follows.

TABLE 9

|  | Embodiment 7 |
| --- | --- |
| Clas_x | −0.0894 |
| Clas_y | 0.0197 |
| S0.1 las_x | −0.325 |
| S0.1 las_y | 0.072 |
| Klas_x | −1.12 |
| Alas_x | 4.65E−06 |
| Dlas | 27 |
| dfirst | 5.095 |
| Dfirst | 6.5 |

A first-order value according to the optical system of Embodiment 7 is as follows.

TABLE 10

|  | Embodiment 7 |
| --- | --- |
| EFL_x | 12.00 mm |
| EFL_y | 28.6 mm |
| NA_x | 0.952 |
| NA_y | 0.952 |
| FOV_x | 16° |
| FOV_y | 4° |
| Distortion_x | −20% |
| Distortion_y | −0.01% |

Figure 27:
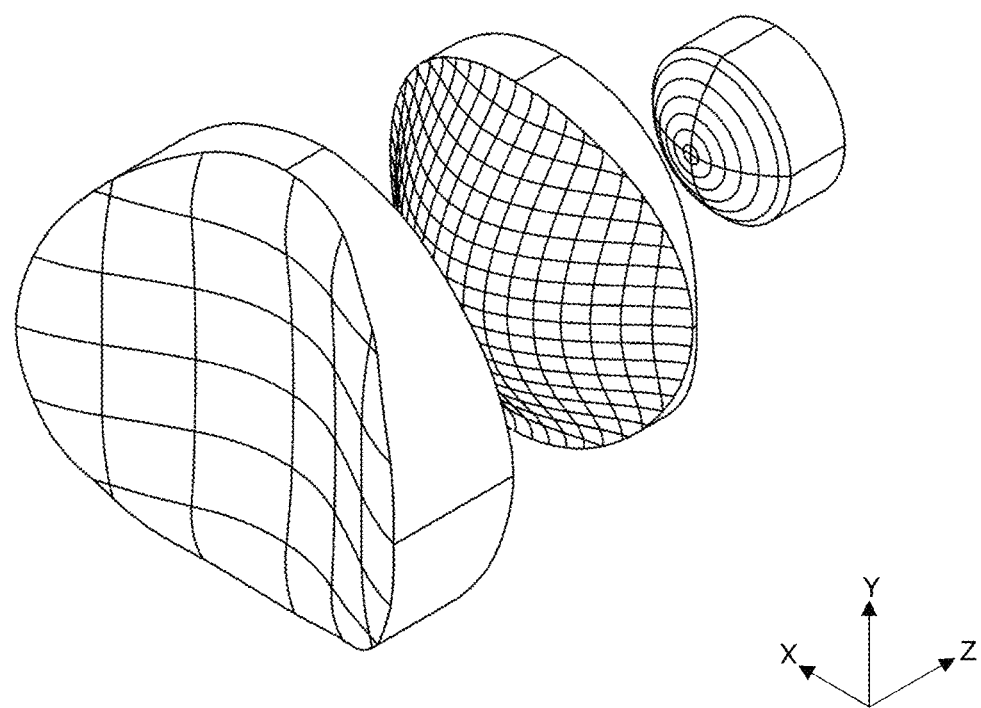
Figure 28:
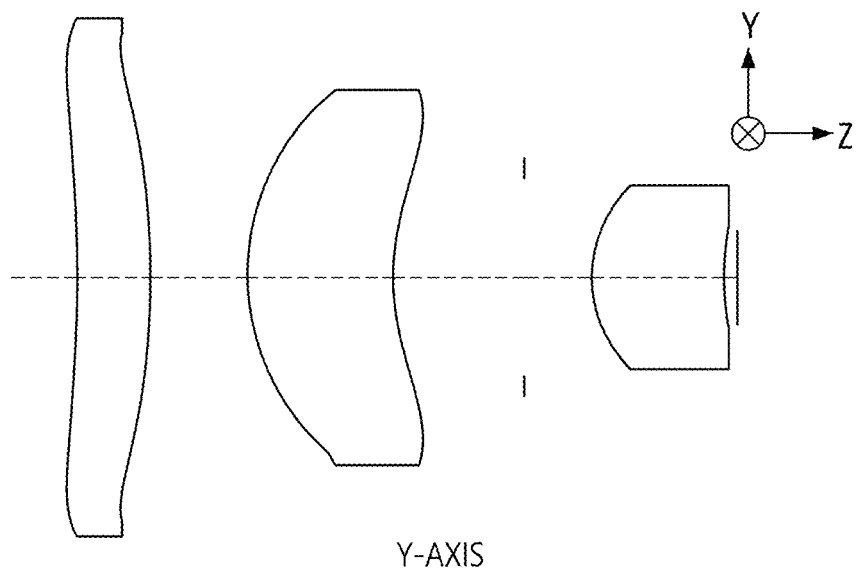
Figure 28:
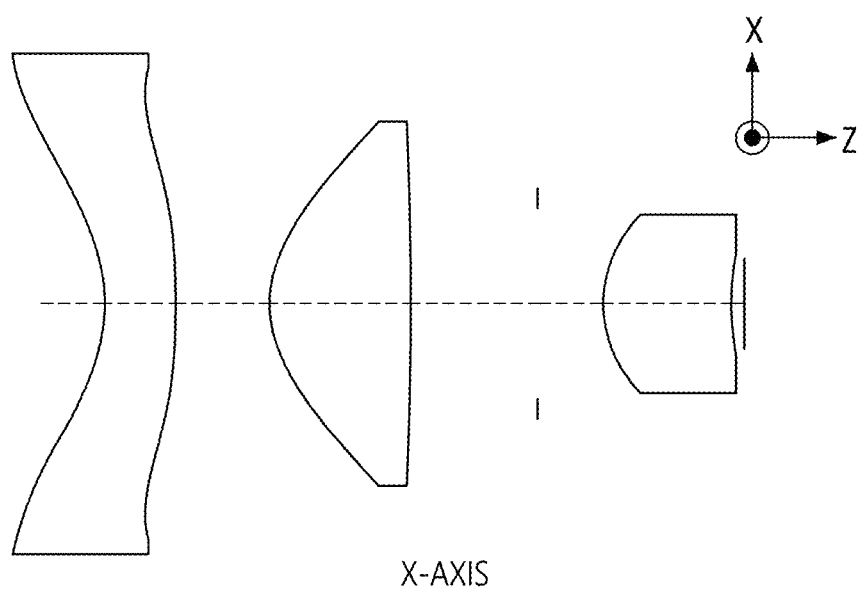
Figure 29:
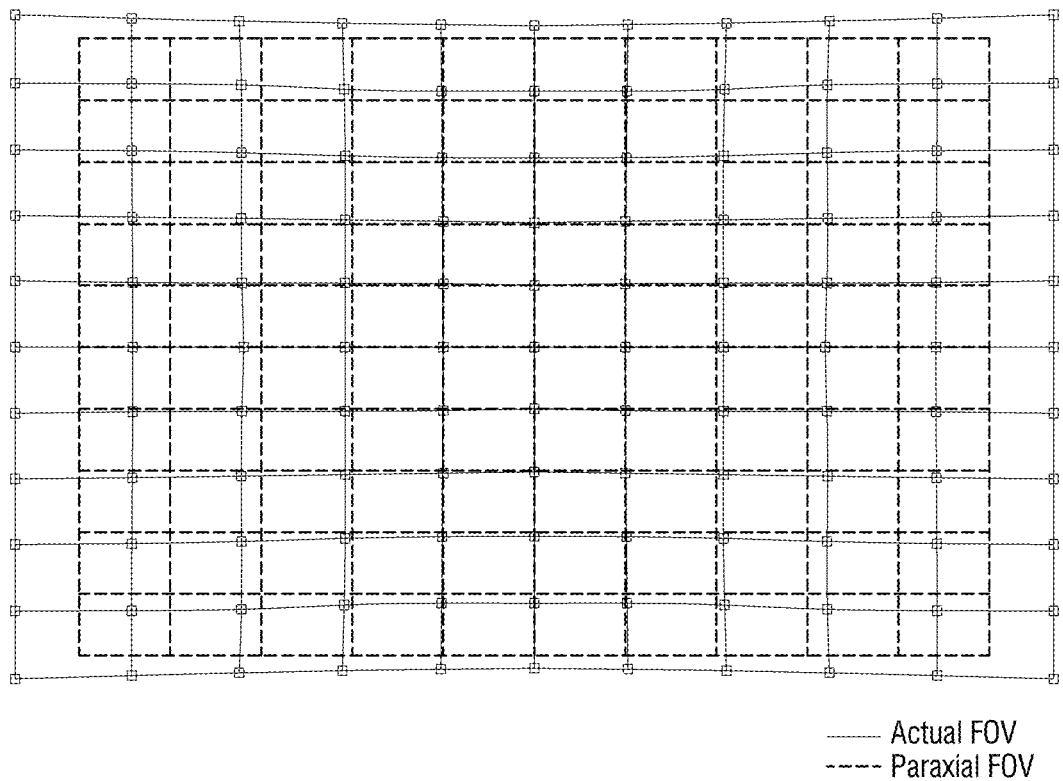
Figure 30:
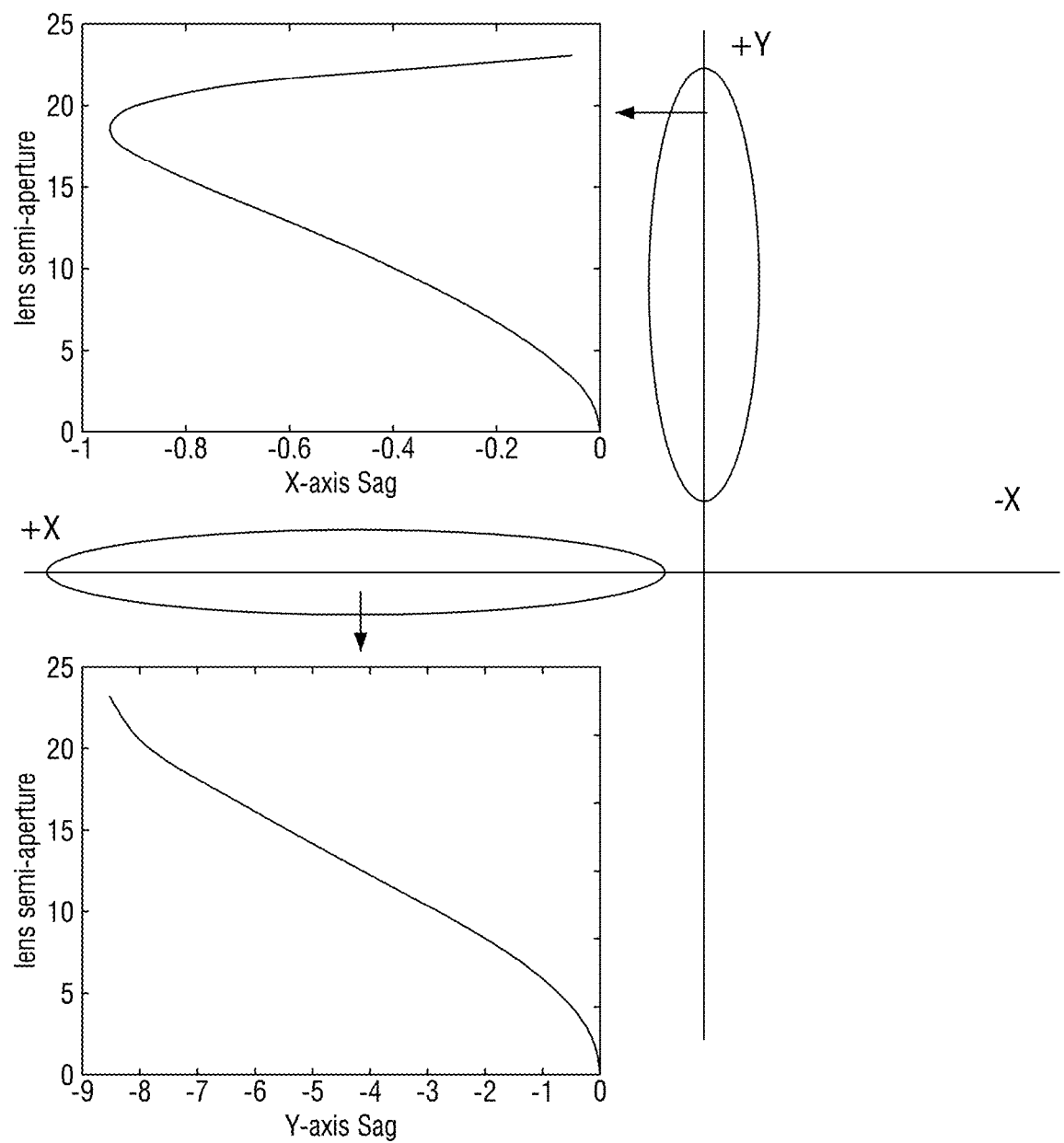

Embodiment 8 may include a shape shown in FIG. 27, and horizontal and vertical cross-sectional views thereof are shown in FIG. 28. FIG. 29 illustrates a distorted grid generated when light is emitted toward the anamorphic surface. It may be seen that a distortion is generated in lateral edges in a horizontal direction. FIG. 30 illustrates a shape of an anamorphic surface of Embodiment 8, which is formed as an aspherical surface and generates a distortion as shown in FIG. 30. Aspherical data with respect to the anamorphic surface which is the aspherical surface of Embodiment 8 is as follows.

TABLE 11

|  | Embodiment 8 |
| --- | --- |
| Clas_x | −0.0642 |
| Clas_y | 0.0102 |
| S0.1 las_x | −0.168 |
| S0.1 las_y | −0.0265 |
| Klas_x | −0.758 |
| Alas_x | 4.582E−05 |
| Dlas | 22.9642 |
| dfirst | 11.806 |
| Dfirst | 8.1818 |

A first-order value according to the optical system of Embodiment 8 is as follows.

TABLE 12

|  | Third Embodiment |
| --- | --- |
| EFL_x | 14.22 mm |
| EFL_y | 22.86 mm |
| NA_x | 0.7 |
| NA_y | 0.7 |
| FOV_x | 15.6° |
| FOV_y | 5.35° |
| Distortion_x | −12% |
| Distortion_y | −3.40% |

Values obtained by Equations 5, 7, and 9 to 12 of Embodiments 6 to 8 are as follows.

TABLE 13

|  | Embodiment 6 | Embodiment 7 | Embodiment 8 |
| --- | --- | --- | --- |
| $\dfrac{C_{las\_x}}{C_{las\_y}}$ | −18.44 | −4.55 | 6.29 |
| $\dfrac{Z_{las\_x}}{Z_{las\_y}}$ | −5767.39 | −92.9083 | 253.813 |
| $\dfrac{K_{las\_x} c^3_{las\_x}}{D^4_{las}}$ | 1.65E−08 | 1.51E−09 | 7.23E−10 |
| $\dfrac{8A_{las\_x}}{D^4_{las}}$ | 1.91E−10 | 7.00E−11 | 1.32E−09 |
| $\dfrac{K_{las\_x} c^3_{las\_x} + 8A_{las\_x}}{K_{las\_y} c^3_{las\_y} + 8A_{las\_y}}$ | 210 | 19.792 | 4.47 |
| $\dfrac{d_{first}}{D_{first}}$ | 0.4814 | 0.7838 | 1.4429 |

As shown in Table 13, Embodiments 6 to 8 may satisfy the conditions of Equations 5, 7, and 9 to 12.

Figure 31:
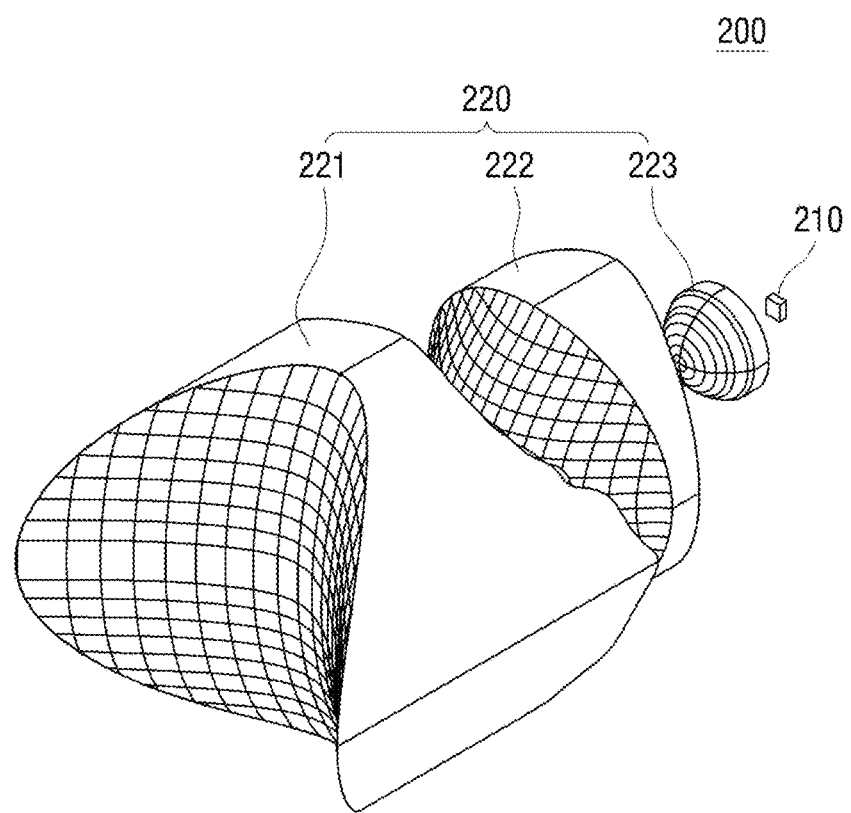
FIG. 31 illustrates a vehicle lamp according to some exemplary embodiments of the present invention.

FIG. 31 illustrates a vehicle lamp according to some exemplary embodiments of the present invention. A vehicle lamp 200 according to some exemplary embodiments of the present disclosure may include a light source 210 and optical lenses 220. Since a detailed description of the optical lens 220 may substantially correspond to the detailed description of the optical system 110 of FIGS. 1 to 16, a repetitive description will be omitted below.

The light source 210 may be an LED and may be a light source which forms an ADB system. The optical lenses 220 may include a plurality of lenses, transmit light emitted by the light source, and have a horizontal field of view and a vertical field of view which are different from each other. To form the horizontal field of view and the vertical field of view which are different from each other, a retro-focus type optical system may be formed in one of a horizontal direction or a vertical direction, and a telephoto type optical system may be formed in the other of the horizontal direction or the vertical direction. Accordingly, a horizontal EFL and a vertical EFL may be formed to be different from each other. In particular, a ratio of the horizontal field of view ratio to the vertical field of view ratio may be more than 1:1 and less than or equal to 4:1, and the horizontal field of view and the vertical field of view may be formed to be 4 degrees or more and 20 degrees or less. The optical lens 220 may have an NA of 0.7 or more.

The lamp implemented as described above may form a beam pattern which may extend laterally to allow a lateral length to be longer than a vertical length. Further, the NA may be formed to be greater than or equal to 0.7 to maintain light intensity at a particular level or higher from a center to an edge. Consequently, conditions of the vehicle lamp may be satisfied, the light source may be used efficiently, and the necessary beam pattern may be formed with lower costs.

Figure 32:
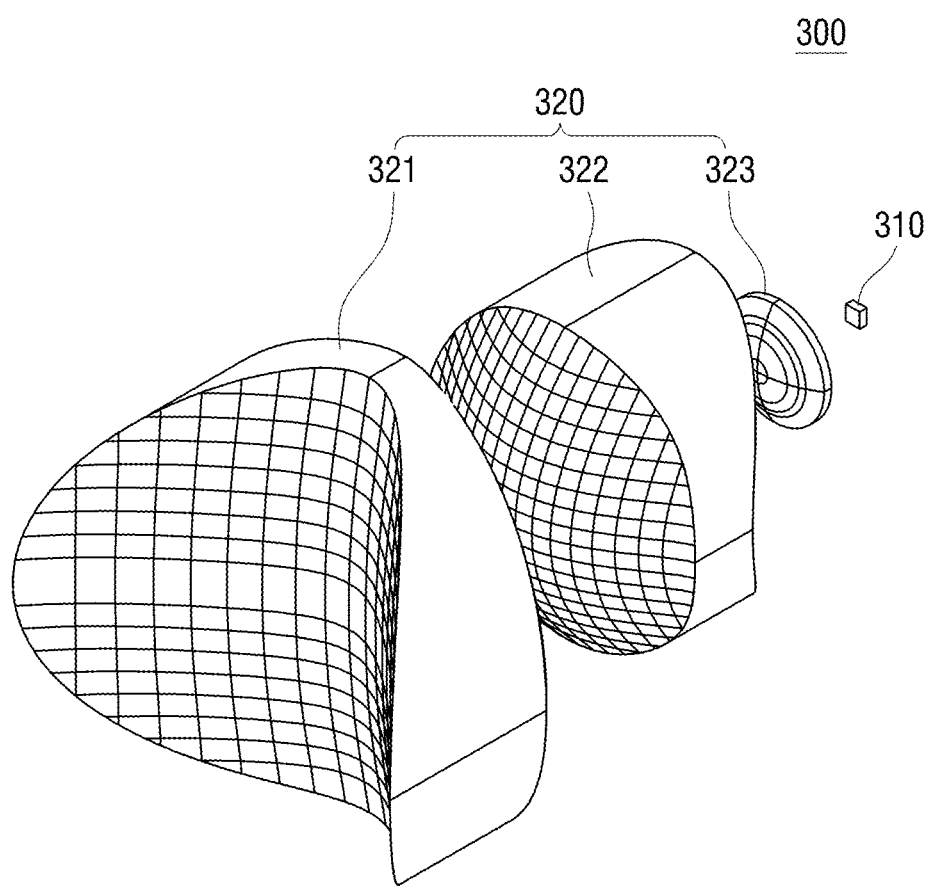
FIG. 32 illustrates a vehicle lamp according to other exemplary embodiments of the present invention.

FIG. 32 illustrates a vehicle lamp according to other exemplary embodiments of the present invention. Since a detailed description of an optical lens 320 may substantially correspond to the detailed description of the optical system 1710 of FIGS. 17 to 30, a repetitive description will be omitted below.

A distortion may be generated to form a pixel size of an image, on which light passing through the optical lens 320 and emitted is formed, that is distorted and gradually increases or decreases from a center toward an edge. The pixel size of the image may gradually increase toward lateral edges. To allow a lateral distortion to be greater than a vertical distortion, a distortion generated in the optical lens 320 may be formed to allow a level of the lateral distortion and a level of the vertical distortion to be different from each other. To form the distortion, the optical lens 320 may be formed such that an anamorphic surface of the optical lens 320 may have a saddle shape, which is horizontally concave and vertically convex or horizontally convex and vertically concave, and may satisfy the conditions of Equation 5 to Equation 12.

The lamp according to exemplary embodiments of the present disclosure may form a distortion such that a lateral length is greater than a vertical length and may form a rectangular beam pattern using one light source. Also, since the distortion is not substantial around the center and gradually increase or decrease toward the edge thereof, light intensity may be maintained at a particular level at the center. Accordingly, conditions of the vehicle lamp may be satisfied, the light source may be efficiently used, and the necessary beam pattern may be formed with reduced costs.

According to the exemplary embodiments of the present disclosure, at least the following effects may be provided. According to the exemplary embodiments of the present disclosure, a beam pattern from a square-shaped light source may be changed to a laterally extending shape for a vehicle light source. Further, an optical system having a high NA may be obtained to increase efficiency of the optical system. Additionally, according to the exemplary embodiments of the present disclosure, a square-shaped light source may be changed to a rectangular shape for a vehicle light source through distortion. Although the rectangular shape may be formed, light intensity may be maintained at a center. An optical system having a high NA may be obtained to increase efficiency of the optical system.

Effects according to the present disclosure are not restricted by the above exemplified content, and a variety of effects are included in the specification. It should be understood by one of ordinary skill in the art that the present disclosure may be embodied in other specific forms without changing the technical concept and essential features of the present disclosure. Therefore, the above-described embodiments should be understood to be exemplary and not limiting in any aspect. The scope of the present disclosure will be defined by the following claims rather than the above detailed description, and all variations and modifications derived from the meaning and the scope of the claims and equivalents thereof should be understood as being included in the scope of the present disclosure.

What is claimed is:

1. An optical system comprising a plurality of lenses, wherein a horizontal field of view and a vertical field of view of the optical system are different from each other, and an overall horizontal effective focal length (EFL) of the optical system and an overall vertical EFL of the optical system are different from each other, wherein a first longitudinal section of the optical system in one of a horizontal direction or a vertical direction exhibits a retro-focus optical configuration, and a second longitudinal section of the optical system in the other of the horizontal direction or the vertical direction exhibits a telephoto optical configuration, and wherein one or more surfaces of the optical system include a saddle shape which is vertically convex and horizontally concave or vertically concave and horizontally convex.

2. The optical system of claim 1, wherein a ratio of the horizontal field of view to the vertical field of view is greater than 1:1 and less than or equal to 4:1.

3. The optical system of claim 1, wherein the overall horizontal EFL of the optical system ($F_x$) and the overall vertical EFL of the optical system ($F_y$) satisfy an equation, $$0.41 \le \frac{F_x}{F_y} \le 0.57.$$

4. The optical system of claim 1, wherein a horizontal EFL of lenses ($f_x$) except a lens closest to a light source and the overall horizontal EFL of the optical system ($F_x$) satisfy an equation, $$1.63 \le \frac{f_x}{F_x} \le 2.49.$$

5. The optical system of claim 1, wherein a vertical EFL of lenses ($f_y$) except a lens closest to a light source, and the overall vertical EFL of the optical system ($F_y$) satisfy an equation, $$1.5 \le \frac{f_y}{F_y} \le 2.49.$$

6. The optical system of claim 1, wherein a horizontal EFL of a lens closest to a light source ($f_{fir\_x}$) and a vertical EFL of the lens closest to the light source ($f_{fir\_y}$) satisfy an equation, $$0.83 \le \frac{f_{fir\_x}}{f_{fir\_y}} \le 1.2.$$

7. The optical system of claim 1, wherein a numerical aperture (NA) is greater than or equal to 0.7.

8. The optical system of claim 1, wherein an overall horizontal field of view of the optical system and an overall vertical field of view of the optical system are greater than or equal to 4 degrees and less than or equal to 20 degrees.

9. An optical system comprising a plurality of lenses, wherein a horizontal field of view and a vertical field of view of the optical system are different from each other, and an overall horizontal effective focal length (EFL) of the optical system and an overall vertical EFL of the optical system are different from each other, wherein a first longitudinal section of the optical system in one of a horizontal direction or a vertical direction exhibits a retro-focus optical configuration, and a second longitudinal section of the optical system in the other of the horizontal direction or the vertical direction exhibits a telephoto optical configuration, wherein a distortion is generated such that a pixel size of an image formed by light that passes through the plurality of lenses gradually increases or decreases from a center toward an edge to be distorted, wherein in the distortion, a horizontal distortion level and a vertical distortion level are different from each other, and wherein an anamorphic surface of the optical system from which the light is emitted includes a saddle shape which is horizontally concave and vertically convex or horizontally convex and vertically concave.

10. The optical system of claim 9, wherein the pixel size of the image gradually increases or decreases toward lateral or vertical edges.

11. The optical system of claim 9, wherein the distortion is generated based on the shape of the anamorphic surface of the optical system.

12. The optical system of claim 9, wherein a horizontal curvature of the anamorphic surface ($c_{las\_x}$) and a vertical curvature of the anamorphic surface ($c_{las\_y}$) of the optical system satisfy an equation, $$-18.4 \leq \frac{c_{las\_x}}{c_{las\_y}} \leq 6.3.$$

13. The optical system of claim 9, wherein the anamorphic surface (las) of the optical system satisfies an equation, $$-5767.4 \leq \frac{z_{las\_x}}{z_{las\_y}} \leq 256.8,$$

$$z = \frac{1}{2} c \cdot s_{0.1}^2$$

wherein x denotes the horizontal direction and y denotes a vertical direction.

14. The optical system of claim 9, wherein the anamorphic surface (las) of the optical system satisfies an equation, $$0.7 \times 10^{-9} \leq \frac{K_{las\_x} c_{las\_x}^3}{D_{las}^4} \leq 1.65 \times 10^{-8},$$

wherein K is a conic constant, c is curvature, and D is a diameter of a lens with the anamorphic surface, and wherein x denotes the horizontal direction and y denotes the vertical direction.

15. The optical system of claim 9, wherein the anamorphic surface (las) of the optical system satisfies an equation, $$0.7 \times 10^{-10} \leq \frac{8 A_{las\_x}}{D_{las}^4} \leq 1.3 \times 10^{-9},$$

wherein A is an aspherical fourth-order constant, and D is a diameter of a lens with the anamorphic surface, and wherein x denotes the horizontal direction and y denotes a vertical direction.

16. The optical system of claim 9, wherein the anamorphic surface (las) of the optical system satisfies an equation, $$4.5 \leq \frac{K_{las\_x} c_{las\_x}^3 + 8 A_{las\_x}}{K_{las\_y} c_{las\_y}^3 + 8 A_{las\_y}} \leq 210,$$

wherein K is a conic constant, c is curvature, and A is an aspherical fourth-order constant, and wherein x denotes the horizontal direction and y denotes a vertical direction.

17. The optical system of claim 9, wherein a thickness of a first lens of the optical system ($d_{first}$) and a diameter of the lens ($D_{first}$) satisfy an equation, $$0.75 \leq \frac{d_{first}}{D_{first}} \leq 1.45.$$

18. The optical system of claim 9, wherein a first lens of the optical system on which the light is incident has an Abbe number that is greater than or equal to 45.

19. The optical system of claim 9, wherein a mean refractive index of all lenses included in the optical system is equal to or greater than 1.6 and equal to or less than 1.8.

20. A vehicle lamp comprising:
a light source; and
optical lenses comprising a plurality of lenses and transmitting light emitted by the light source,
wherein in the optical lenses, a horizontal field of view and a vertical field of view are different from each other, and a horizontal effective focal length (EFL) and a vertical EFL are different from each other,
wherein a first longitudinal section of the optical system in one of a horizontal direction or a vertical direction exhibits a retro-focus optical configuration, and a second longitudinal section of the optical system in the other of the horizontal direction or the vertical direction exhibits a telephoto optical configuration, and
wherein one or more surfaces of the optical lens include a saddle shape which is vertically convex and horizontally concave or vertically concave and horizontally convex.

21. The optical system of claim 20, wherein a distortion is generated such that a pixel size of an image, on which light that passes through the optical lenses and is emitted is formed, gradually increases or decreases from a center toward an edge to be distorted, and
wherein in the distortion, a horizontal distortion level and a vertical distortion level are different from each other.

* * * * *